United States Patent

Onda

[11] Patent Number: 5,867,591
[45] Date of Patent: Feb. 2, 1999

[54] METHOD OF MATCHING STEREO IMAGES AND METHOD OF MEASURING DISPARITY BETWEEN THESE IMAGE

[75] Inventor: Katsumasa Onda, Yokohama, Japan

[73] Assignee: Matsushita Electric Industrial Co., Ltd., Osaka, Japan

[21] Appl. No.: 629,708

[22] Filed: Apr. 9, 1996

[30] Foreign Application Priority Data

Apr. 21, 1995 [JP] Japan ................................. 7-097204

[51] Int. Cl.⁶ ............................ G06K 9/00; H04N 13/00
[52] U.S. Cl. ............................. 382/154; 348/43; 348/47
[58] Field of Search .......................... 382/154, 153, 382/168, 171, 173, 209, 255, 276–280, 285, 293–294, 106; 356/2, 12; 348/42, 43, 47; 345/419, 425, 427, 139

[56] References Cited

U.S. PATENT DOCUMENTS

| | | | |
|---|---|---|---|
| 4,745,562 | 5/1988 | Prazdny | 364/551.01 |
| 5,309,522 | 5/1994 | Dye | 382/154 |
| 5,383,013 | 1/1995 | Cox | 356/2 |
| 5,530,774 | 6/1996 | Fogel | 382/154 |
| 5,577,130 | 11/1996 | Wu | 382/106 |
| 5,606,627 | 2/1997 | Kuo | 382/154 |
| 5,612,735 | 3/1997 | Haskell et al. | 348/43 |
| 5,652,616 | 7/1997 | Chen et al. | 348/43 |
| 5,684,890 | 11/1997 | Miyashita et al. | 382/154 |

FOREIGN PATENT DOCUMENTS

| | | |
|---|---|---|
| 2100589 | 4/1990 | Japan . |
| 6195445 | 7/1994 | Japan . |

OTHER PUBLICATIONS

"Image Processing Handbook" by M. Onoue, Shokodo Publishing Co., Ltd., pp. 396–397, 1987.

"Drive Assist System by means of 3–D Image Recognition Technique" by Saneyoshi et al, pp. 169–172, Automotive Vehicle Technical Institute Scientific Lecture Meeting, Oct., 1992.

Primary Examiner—Leo H. Boudreau
Assistant Examiner—Bhavesh Mehta
Attorney, Agent, or Firm—Lowe Hauptman Gopstein Gilman & Berner

[57] ABSTRACT

In the image pickup phase (A), right and left images are taken in through two image-pickup devices (S101, S102). Then, in the next feature extraction phase (B), right and left images are respectively subjected to feature extraction (S103, S104). Thereafter, in the succeeding matching phase (C), the extracted features of right and left images are compared to check how they match with each other (step S105). More specifically, in the matching phase (C), a one-dimensional window is set, this one-dimensional window is shifted along the left image in accordance with a predetermined scanning rule so as to successively set overlapped one-dimensional windows, and a matching operation is performed by comparing the image features within one window and corresponding image features on the right image. Subsequently, in the disparity determination phase (D), the left image is dissected or divided into plural blocks each having a predetermined size, a histogram in each block is created from disparities obtained by the matching operation based on one-dimensional windows involving pixels of a concerned block, and a specific disparity just corresponding to the peak of thus obtained histogram is identified as a valid disparity representing the concerned block (S106).

4 Claims, 28 Drawing Sheets

FL1 FREQUENCY COMPONENT

FL2 FREQUENCY COMPONENT

FL3 FREQUENCY COMPONENT

FL4 FREQUENCY COMPONENT

FIG. 17

LEFT WINDOW
TLk(x,y)

| 1 | 1 | 1 | 1 | 0 | 0 | 0 | 0 | 0 | -1 | -1 | -1 | -1 |

RIGHT WINDOW
TRk(x,y)

| 1 | 1 | 0 | 0 | 0 | 0 | 0 | -1 | -1 | -1 | -1 | -1 | -1 |

SIMILARITY EVALUATION
RESULT

| P | P | P | 0 | 0 | Z | Z | Z | Z | 0 | P | P | P | P |

| | | | |
|---|---|---|---|
| LEFT | 0 | 1 | OTHER COMBINATION |
| RIGHT | 0 | 1 | -1 |
| | | -1 | |
| EVALUATION | Z | P | P | 0 |

$$Eall = \sum_{k=1}^{k=n} \beta_k (PN)_k + \sum_{k=1}^{k=n} \gamma_k (ZN)_k$$

(PN): TOTAL NUMBER OF PIXELS HAVING EVALUATION RESULT "P"
(ZN): TOTAL NUMBER OF PIXELS HAVING EVALUATION RESULT "Z"
$\beta_k, \gamma_k$: WEIGHTING FACTORS

SIMILARITY EVALUATION

FIG. 25 TERNARY-VALUE PROCESSING (G)

METHOD OF MATCHING STEREO IMAGES AND METHOD OF MEASURING DISPARITY BETWEEN THESE IMAGE

BACKGROUND OF THE INVENTION

1. Field of the Invention

This invention generally relates to a method of matching stereo images and a method of detecting disparity between these images, which is chiefly used in the industrial field of stereo cameras for detecting positional information in the image pickup space based on stereo images, volume compression of overall stereo images (i.e. three-dimensional video images), display control of these stereo images, and for the optical flow extraction of moving images and so on.

2. Prior Art

Generally known, conventional methods of matching stereo images and of detecting disparity between these images will be hereinafter explained with reference to a so-called stereo image measurement technology where the position or distance information can be obtained in the image-pickup space by performing the matching between two images (stereo images) and detecting a disparity between these images.

FIG. 1 is a view illustrating the principle of a typical stereo image measurement. In FIG. 1, a three-dimensional coordinate, generally defined by variables x, y and z, represents the real space. A two-dimensional coordinate, generally defined by variables X and Y, represents the plane of image (i.e. an image-pickup plane of a camera). There are provided a pair of two-dimensional coordinates for a pair of cameras 23R and 23L. A position on the image plane of right camera 23R can be expressed by variables XR and YR on one two-dimensional coordinate. A position on the image plane of left camera 23L can be expressed by variables XL and YL on the other two-dimensional coordinate.

Axes XL and XR are parallel to the axis x, while axes YL and YR are parallel to the axis y. Axis z is parallel to the optical axes of two cameras 23R and 23L. The origin of the real space coordinate (x, y, z) coincides with a midpoint between the projective centers of right and left cameras 23R and 23L. The distance between the projective centers is generally referred to as a base length denoted by 2a. A distance, denoted by f, is a focal distance between each projective center and its image plane.

It is now assumed that a real-space point p is projected at a point PR(XR,YR) on the right image plane and at the same time a point PL(XL,YL) on the left image plane. According to the stereo image measurement, PR and PL are determined on respective image planes (by performing the matching of stereo images) and then the real-space coordinate (x, y, z) representing the point p is obtained based on the principle of the trigonometrical survey.

YR and YL have identical values in this case, because two optical axes of cameras 23R and 23L exist on the same plane and X axes of cameras 23R and 23L are parallel to axis x. The relationship between the coordinate values XR, YR, XR, YR and the real-space coordinate values x, y, z is expressed in the following equation.

$$x = \frac{a(XL + XR)}{XL - XR}, \; y = \frac{2aYL}{XL - XR}, \; z = \frac{2af}{XL - XR} \quad \text{(Eq. 1)}$$

$$XL = \frac{(x+a)f}{z}, \; XR = \frac{(x-a)f}{z}, \; YL = YR = \frac{y \cdot f}{z} \quad \text{(Eq. 2)}$$

where d represents the disparity (between stereo images).

$$d = XL - XR \quad \text{(Eq. 3)}$$

As "a" is a positive value (a>0), the following relation is derived from the above equation 2.

$$XL > XR \text{ and } YL = YR \quad \text{(Eq. 4)}$$

Understood from the above-given relationship is that a specific point on one image plane has a matching point on the other image plane along the same scanning line serving as an epipolar line within the region define by XL>XR. Accordingly, the matching point corresponding to a specific point on one image plane can be found on the other image plane by checking the similarity of images in each micro area along the line having the possibility of detecting the matching point.

Some of similarity evaluation methods will be explained below FIG. 2 shows a conventional method of detecting a mutual correlation value between two images, disclosed in "Image Processing Handbook" (Shokodo publishing Co. Ltd.) by Morio ONOUE et al., for example.

First of all, designation is given to a pixel 2403 existing somewhere on the left image 2401. A pixel matching to this pixel 2403 is next found along the plane of right image 2402. In other words, the matching point is determined. More specifically, a square micro area 2404 (hereinafter referred to as a micro area) is set on the right image 2401 so as to have a size corresponding to n×m pixels sufficient to involve the designated pixel 2403 at the center thereof. It is now assumed that IL(i,j) represents the brightness of each point (pixel) within the micro area 2404.

On the other hand, a square micro area 2405 on the right image 2402 is designated as a micro area having its center on a pixel satisfying the condition of equation 4. The micro area 2405 has a size corresponding to n x m pixels. It is assumed that IR(i,j) represents the brightness of each point (pixel) within the micro area 2405.

Furthermore, it is assumed that $\mu L$, $\mu R$, $\sigma L2$ and $\sigma R2$ represent averages and variances of the brightness in the micro areas 2404 and 2405. The mutual correlation value of these micro areas can be given by the following equation.

$$c = \frac{\Sigma\Sigma(IL(i,j) - \mu L)(IR(i,j) - \mu R)}{\sqrt{(\sigma L^2 \sigma R^2)}} \quad \text{(Eq. 5)}$$

The value "c" defined by the equation 5 is calculated along the straight line (epipolar line) having the possibility of detecting a matching point. Then, the point where the value "c" is maximized is identified as the matching point to be detected. According to this method, it becomes possible to determine the matching point as having the size identical with a pixel. If the matching point is once found, the disparity "d" can be immediately obtained using the equation 3 based on the coordinate values representing thus found matching point.

However, this conventional method is disadvantageous in that a great amount of computations will be required for completely obtaining all the matching points of required pixels since even a single search of finding only one matching point of a certain pixel requires the above-described complicated computations to be repetitively performed with respect to the entire region having the possibility of detecting the matching point.

The computations for obtaining the correlation can be speeded up with reducing size of the micro area, although the stability in the matching point detection will be worsened due to increase of image distortion and noises. On the contrary, increasing the size of the micro area will not only increase the computation time but deteriorate the accuracy in the matching point detection because of the change of correlation values being undesirably moderated. Thus, it will be required to adequately set the size of the micro area by considering the characteristics of the image to be handled.

Furthermore, as apparent from the equation 3, the characteristics of the above-described conventional method resides in that the determination of the disparity directly reflects the result of stereo image matching. Hence, any erroneous matching will cause an error in the measurement of disparity "d". In short, an error in the stereo image matching leads to an error in the disparity measurement.

In this manner, the method of determining a matching point with respect to each of pixels is disadvantageous in that the volume of computations becomes huge. To solve this problem, one of proposed technologies is a method of dividing or dissecting the image into several blocks each having a predetermined size and determining the matching region based on the dissected blocks. For example, "Driving Aid System based on Three-dimensional Image Recognition Technology", by Jitsuyoshi et al., in the Pre-publishing 924, pp. 169–172 of Automotive Vehicle Technical Institute Scientific Lecture Meeting, October in 1992, discloses such a method of searching the matching region based on the comparison between the blocks of right and left images.

FIG. 3 is a view illustrating the conventional method of performing the matching of stereo images between square micro areas (blocks). The left image 2501, serving as a reference image, is dissected into a plurality of blocks so that each block (2503) has a size equivalent to n×m pixels. To obtain the disparity, each matching region with respect to each block on the left image 2501 is searched along the plane of right image 2502. The following equation is a similarity evaluation used for determining the matching region.

$$C = \Sigma |Li - Ri| \quad \text{(Eq. 6)}$$

where Li represents luminance of i-th pixel in the left block 2503, while Ri represents luminance of i-th pixel in the right block 2504.

This evaluation is not so complicated when it is compared with the calculation of equation 5 which includes the computations of subtracting the average values. However, the hardware scale is still large because of line memories used for the evaluation of two-dimensional similarity. Furthermore, the overall processing time required will be fairly long due to too many accesses to the memories.

Moreover, using the luminance value for the similarity evaluation will increase the hardware cost because the preprocessing is additionally required for adjusting the sensitivity difference between right and left cameras and for performing the shading correction before executing the stereo image matching processing.

A straight line existing in the image-pickup space may be image-formed as straight lines 2603 and 2604 different in their gradients in blocks 2605 and 2606 of left and right images 2601 and 2602, as shown in FIG. 4. In such a case, it may fail to accurately determine the matching regions.

On the contrary, two different lines may be image-formed as identical lines in blocks 2703 and 2704 on left and right images 2701 and 2702 as shown in FIG. 5. Hence, comparing the pixels between two blocks 2703 and 2704 only will cause a problem that the stereo image matching may be erroneously performed and the succeeding measurement of disparity will be failed.

According to the above-described disparity measuring methods, the unit for measuring each disparity is one pixel at minimum because of image data of digital data sampled at a certain frequency. However, it is possible to perform the disparity measurement more accurately.

FIG. 6 is a view illustrating a conventional disparity measuring method capable of detecting a disparity in a sub-pixel level accuracy. FIG. 6 shows a peak position found in the similarity evaluation value C (ordinate) when the equation 6 is calculated along the search region in each block. The sub-pixel level disparity measurement is performed by using similarity evaluations $C_i$, $C_{i-1}$, $C_{i+1}$ corresponding to particular disparities $d_i$, $d_{i-1}$, $d_{i+1}$ (in the increment of pixel) existing before and after the peak position. More specifically, a first straight line 2801 is obtained as a line crossing both of two points ($d_{i-1}$, $C_{i-1}$) and ($d_i$, $C_i$). A second straight line 2802 is obtained as a line crossing a point ($d_{i+1}$, $C_{i+1}$) and having a gradient symmetrical with the line 2801 (i.e. identical in absolute value but opposite in sign). Then, a point 2803 is obtained as an intersecting point of two straight lines 2801 and 2802. A disparity ds, corresponding to thus obtained intersecting point 2803, is finally obtained as a sub-pixel level disparity of the concerned block.

As apparent from the foregoing description, the above-described conventional stereo image matching methods and disparity detecting methods are generally suffering from increase of hardware costs and enlargement of processing time due to four rules' arithmetic calculations of equations 5 and 6 required for the similarity evaluation in the stereo image matching.

Furthermore, performing the similarity evaluation based on two-dimensional windows necessarily requires the provision of line memories as hardware which possibly requires frequent accesses to the memories, resulting in further increase of hardware costs and enlargement of processing time.

Still further, utilizing the comparison of luminance difference between right and left images definitely increases the hardware costs for the addition of preprocessing components, used in the sensitivity adjustment and shading correction between right and left cameras which are performed before executing the stereo image matching.

Yet further, using a single block as the unit for determining the disparity identical in size with a two-dimensional window serving as the unit for the matching will cause a problem that any error occurring in the matching phase based on the two-dimensional window will directly give an adverse effect on the disparity detection of the corresponding block. In short, there is no means capable of absorbing or correcting the error occurring in the matching phase.

Moreover, determining each matching region using only the pixels existing in a block (=two-dimensional window) will possibly result in the failure in the detection of a true matching region.

SUMMARY OF THE INVENTION

Accordingly, in view of above-described problems encountered in the prior art, a principal object of the present invention is to provide a method of matching stereo images and of detecting disparity between these images, small in the volume of computations, compact in the hardware construction, quick in processing, highly reliable, and excellent in accuracy.

In order to accomplish this and other related objects, a first aspect of the present invention provides a novel and excellent method of matching stereo images, comprising the steps of: inputting first and second images IL and IR; developing the images IL and IR into a plurality of frequency component images FL1, FL2, FL3, - - - , FLk, FLk+1, - - - , FLn and a plurality of frequency component images FR1, FR2, FR3, - - - , FRk, FRk+1, - - - , FRn, respectively; applying a secondary differential processing to each of the frequency component images; converting each frequency component image, after being applied the secondary differential processing, into ternary values pixel by pixel, thereby obtaining ternary-valued frequency component images TL1, TL2, TL3, - - - , TLk, TLk+1, - - - , TLn and ternary-valued frequency component images TR1, TR2, TR3, - - - , TRk, TRk+1, - - - , TRn; and performing a matching operation between the first and second images based on the ternary-valued frequency component images.

A second aspect of the present invention provides a method of matching stereo images, comprising the steps of: inputting first and second images IL and IR; developing the images IL and IR into a plurality of frequency component images FL1, FL2, FL3, - - - , FLk, FLk+1, - - - , FLn and a plurality of frequency component images FR1, FR2, FR3, - - - , FRk, FRk+1, - - - , FRn, respectively; applying a secondary differential processing to each of the frequency component images; converting each frequency component image, after being applied the secondary differential processing, into ternary values pixel by pixel by using a positive threshold TH1(>0) and a negative threshold TH2 (<0) in such a manner that a pixel larger than TH1 is designated to "p", a pixel in a range between TH1 and TH2 is designated to "z", and a pixel smaller than TH2 is designated to "m", thereby obtaining ternary-valued frequency component images TL1, TL2, TL3, - - - , TLk, TLk+1, - - - , TLn and ternary-valued frequency component images TR1, TR2, TR3, - - - , TRk, TRk+1, - - - , TRn; and performing a matching operation between the first and second images based on the ternary-valued frequency component images.

A third aspect of the present invention provides a method of matching stereo images, comprising the steps of: inputting first and second images IL and IR; developing the images IL and IR into a plurality of frequency component images FL1, FL2, FL3, - - - , FLk, FLk+1, - - - , FLn and a plurality of frequency component images FR1, FR2, FR3, - - - , FRk, FRk+1, - - - , FRn, respectively; applying a secondary differential processing to each of the frequency component images; converting each frequency component image, after being applied the secondary differential processing, into ternary values pixel by pixel in such a manner that a pixel not related to a zero-crossing point is designated to "z", a pixel related to a zero-crossing point and having a positive gradient is designated to "p", and a pixel related to a zero-crossing point and having a negative gradient is designated to "m", thereby obtaining ternary-valued frequency component images TL1, TL2, TL3, - - - , TLk, TLk+1, - - - , TLn and ternary-valued frequency component images TR1, TR2, TR3, - - - , TRk, TRk+1, - - - , TRn; and performing a matching operation between the first and second images based on the ternary-valued frequency component images.

A fourth aspect of the present invention provides a method of matching stereo images, comprising the steps of: inputting first and second images IL and IR; developing the images IL and IR into a plurality of frequency component images FL1, FL2, FL3, - - - , FLk, FLk+1, - - - , FLn and a plurality of frequency component images FR1, FR2, FR3, - - - , FRk, FRk+1, - - - , FRn, respectively; applying a secondary differential processing to each of the frequency component images; converting each low frequency component image of the frequency component images, after being applied the secondary differential processing, into ternary values pixel by pixel by using a positive threshold TH1(>0) and a negative threshold TH2(<0) in such a manner that a pixel larger than TH1 is designated to "p", a pixel in a range between TH1 and TH2 is designated to "z", and a pixel smaller than TH2 is designated to "m", and converting each high frequency component image of the frequency component images, after being applied the secondary differential processing, into ternary values pixel by pixel in such a manner that a pixel not related to a zero-crossing point is designated to "z", a pixel related to a zero-crossing point and having a positive gradient is designated to "p", and a pixel related to a zero-crossing point and having a negative gradient is designated to "m", thereby obtaining ternary-valued frequency component images TL1, TL2, TL3, - - - , TLk, TLk+1, - - - , TLn and ternary-valued frequency component images TR1, TR2, TR3, - - - , TRk, TRk+1, - - - , TRn; and performing a matching operation between the first and second images based on the ternary-valued frequency component images.

According to the features of preferred embodiments of the present invention, the first image IL is designated as a reference image for the matching operation, a one-dimensional window capable of encompassing N pixels therein is set on the ternary-valued frequency component image of the first image IL, and a matching region having the same ternary-value pattern as the N pixels in the one-dimensional window is searched from the ternary-valued frequency component image of the second image IR.

According to the features of the preferred embodiments of the present invention, one of the first and second images IL and IR is designated as a reference image for the matching operation, a plurality of one-dimensional windows are set on the entire surface of the ternary-valued frequency component image of the reference image through a scanning operation along an epipolar line, so that the one-dimensional windows are successively overlapped at the same intervals of N/2 when each of the one-dimensional windows has a size equivalent to N pixels, and the matching operation is carried out with respect to each of the one-dimensional windows.

According to the features of the preferred embodiments of the present invention, pixels in a one-dimensional window of a ternary-valued frequency component image TLk of the first image IL are compared in a one-to-one manner with pixels in a designated region of a ternary-valued frequent component image TRk of the second image IR, when the ternary-valued frequency component images TLk and TRk are identical in their frequency components, wherein an evaluation result "P" is obtained when corresponding two pixels are both "p" or "m", while an evaluation result "Z" is obtained when the corresponding two pixels are both "z", and a similarity between two ternary-valued frequency component images TLk and TRk is evaluated by using the following equation:

$$E_{all} = \Sigma \beta k (PN)k + \Sigma \gamma k (ZN)k$$

where PN represents a total number of pixels having the evaluation result "P", ZN represents a total number of pixels having the evaluation result "Z", and $\beta k$ and $\gamma k$ represent weighting factors.

According to the features of the preferred embodiments of the present invention, pixels in a one-dimensional window of a ternary-valued frequency component image TLk of the first image IL are compared in a one-to-one manner with pixels in a designated region of a ternary-valued frequent component image TRk of the second image IR, when the ternary-valued frequency component images TLk and TRk are identical in their frequency components, wherein an evaluation result "P" is obtained when corresponding two pixels are both "p" or "m", while an evaluation result "Z" is obtained when the corresponding two pixels are both "z", a similarity between two ternary-valued frequency component images TLk and TRk is evaluated by using the following equation:

$$E_{all} = \Sigma \beta k(PN)k + \Sigma \gamma k(ZN)k$$

where PN represents a total number of pixels having the evaluation result "P", ZN represents a total number of pixels having the evaluation result "Z", and βk and γk represent weighting factors, and a matching result in the matching operation is validated only when Σ βk(PN)k is larger than a predetermined threshold TH3(>0).

Furthermore, a fifth aspect of the present invention provides a novel and excellent method of detecting a disparity between stereo images, comprising the steps of: comparing pixels in a micro region defined by a one-dimensional window set on a reference image with pixels in a designated micro region on a non-reference image; evaluating a similarity between two micro regions using the following equation:

$$E_{all} = \Sigma \beta k(PN)k + \Sigma \beta k(ZN)k$$

where PN represents a total number of pixels having an evaluation result "P" while ZN represents a total number of pixels having an evaluation result "Z", and βk and γk represent weighting factors; searching a first region having a most highest similarity and a second region having a second highest similarity; specifying a first candidate disparity as a disparity corresponding to the first region, and a second candidate disparity as a disparity corresponding to the second region; and determining a valid disparity between the stereo images based on the first and second candidate disparities.

Moreover, a sixth aspect of the present invention provides a method of detecting a disparity between stereo images, comprising the steps of: dividing each of first and second images IL and IR into a plurality of blocks each having a size of M=L pixels; matching ternary-valued frequency component images of the images IL and IR; comparing pixels in a micro region defined by a one-dimensional window set on the first image IL with pixels in a designated micro region on the second image IR; evaluating a similarity between two micro regions using the following equation:

$$E_{all} = \Sigma \beta k(PN)k + \Sigma \gamma k(ZN)k$$

where PN represents a total number of pixels having an evaluation result "P" while ZN represents a total number of pixels having an evaluation result "Z", and βk and γk represent weighting factors; searching a first region having a most highest similarity and a second region having a second highest similarity in a concerned block; specifying a first candidate disparity as a disparity corresponding to the first region, and a second candidate disparity as a disparity corresponding to the second region; creating a histogram based on the first and second candidate disparities; and determining a valid disparity of the concerned block as a disparity corresponding to a peak position of the histogram.

According to the features of the preferred embodiments of the present invention, in the above-described disparity detecting method, the first image IL is designated as a reference image, a one-dimensional window capable of encompassing N pixels therein is set on the ternary-valued frequency component image of the first image IL, and a matching region having the same ternary-value pattern as the N pixels in the one-dimensional window is searched from the ternary-valued frequency component image of the second image IR. Alternatively, one of the first and second images IL and IR is designated as a reference image, a plurality of one-dimensional windows are set on the entire surface of the ternary-valued frequency component image of the reference image through a scanning operation along an epipolar line, so that the one-dimensional windows are successively overlapped at the same intervals of N/2 when each of the one-dimensional windows has a size equivalent to N pixels, and a matching operation is carried out with respect to each of the one-dimensional windows.

According to the features of the preferred embodiments, the valid disparity is calculated as a sub-pixel level parity corresponding to an intersecting point of a first straight line crossing two points (di−1, hi−1), (di, hi) and a second straight line crossing a point (di+1, hi+1) with a gradient symmetrical with the first straight line, where di−1, di, di+1 represent disparities near the peak position of the histogram and hi−1, hi, hi+1 represent the number of occurrences of the disparities di−1, di, di+1 respectively.

BRIEF DESCRIPTION OF THE DRAWINGS

The above and other objects, features and advantages of the present invention will become more apparent from the following detailed description which is to be read in conjunction with the accompanying drawings, in which:

FIG. 17 is a view illustrating a method of evaluating a similarity based on the one-dimensional window search of the present invention;

DETAILED DESCRIPTION OF THE PREFERRED EMBODIMENTS

Figure 1:
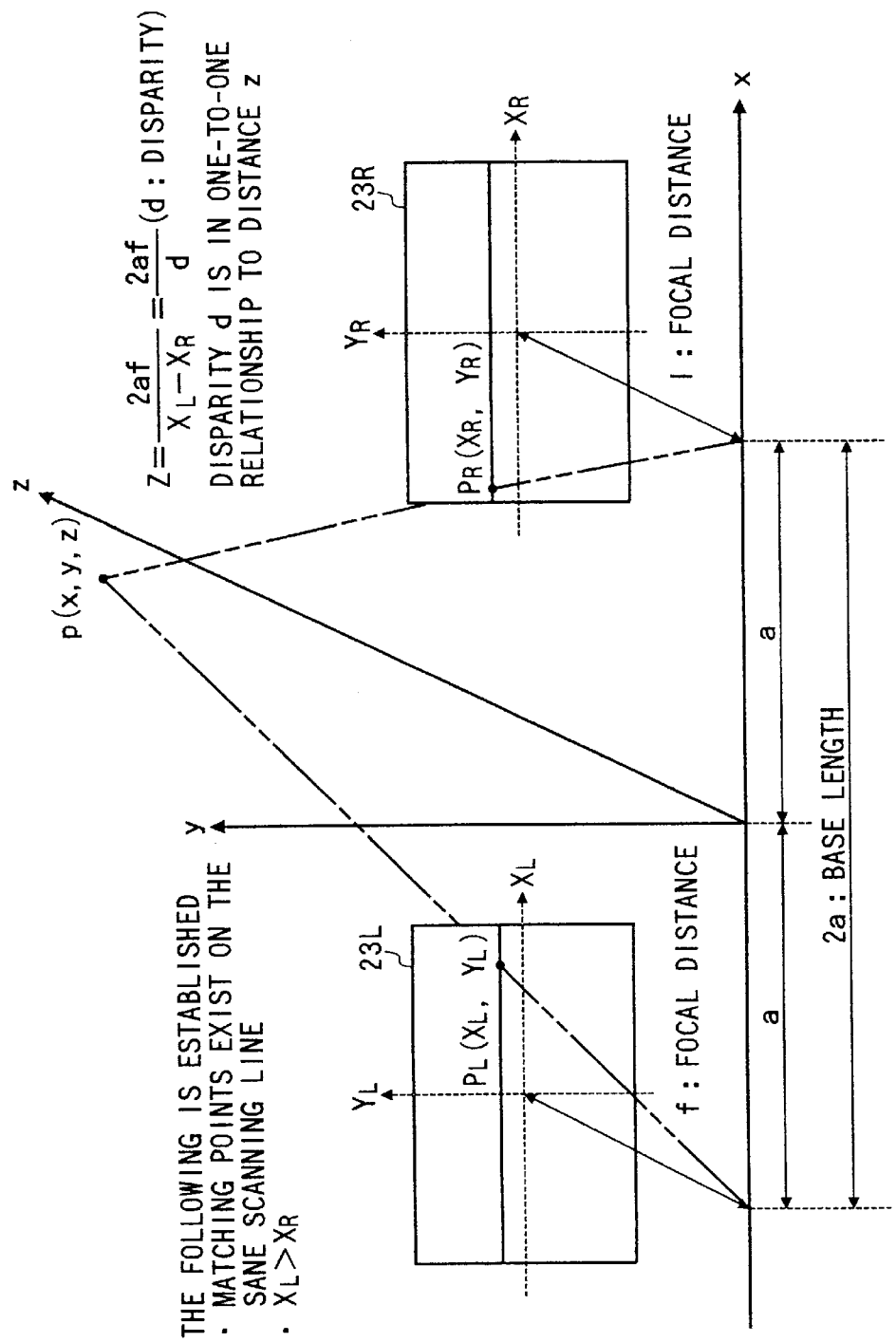
FIG. 1 is a view illustrating the principle of the stereo image measurement.
Figure 2:
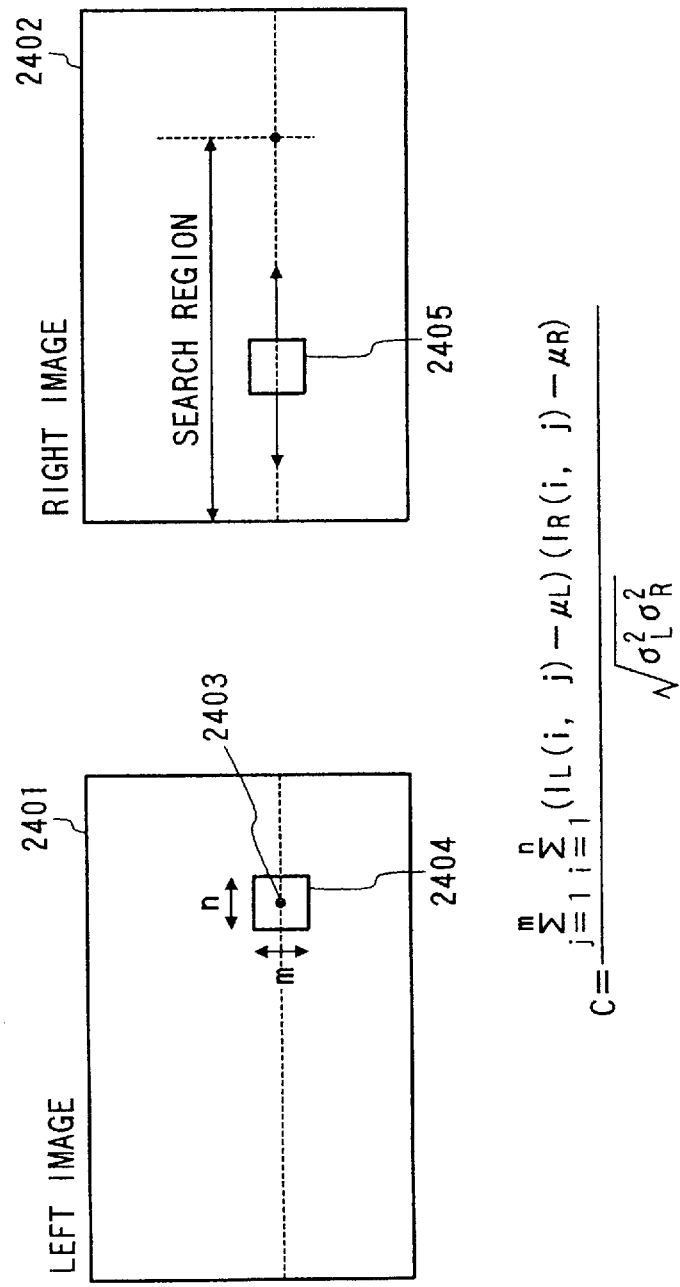
FIG. 2 is a view illustrating a conventional method of checking a mutual correlation value between two images.
Figure 3:
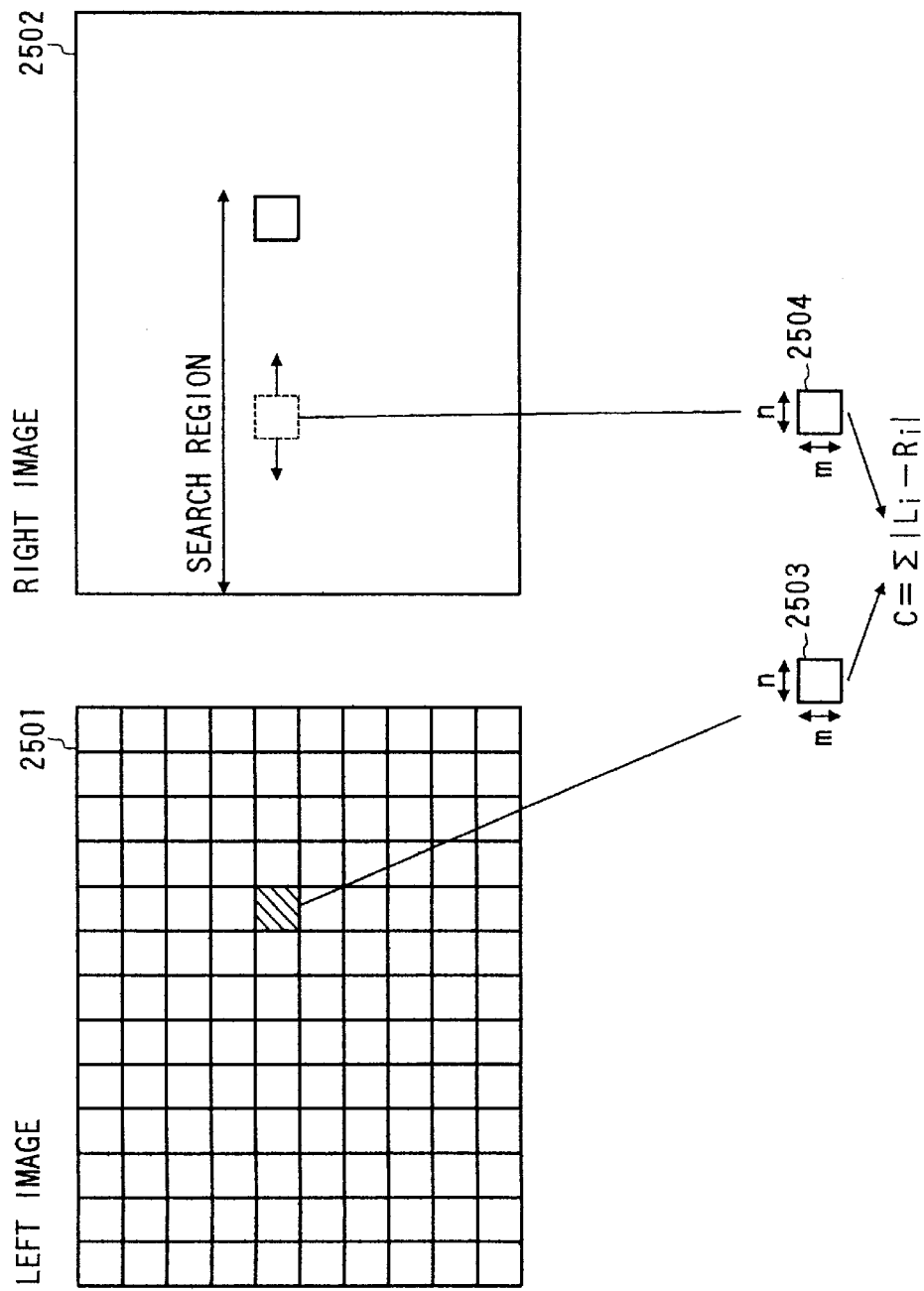
FIG. 3 is a view illustrating a conventional method of matching stereo images based on the comparison of square micro regions (blocks) of two images.
Figure 4:
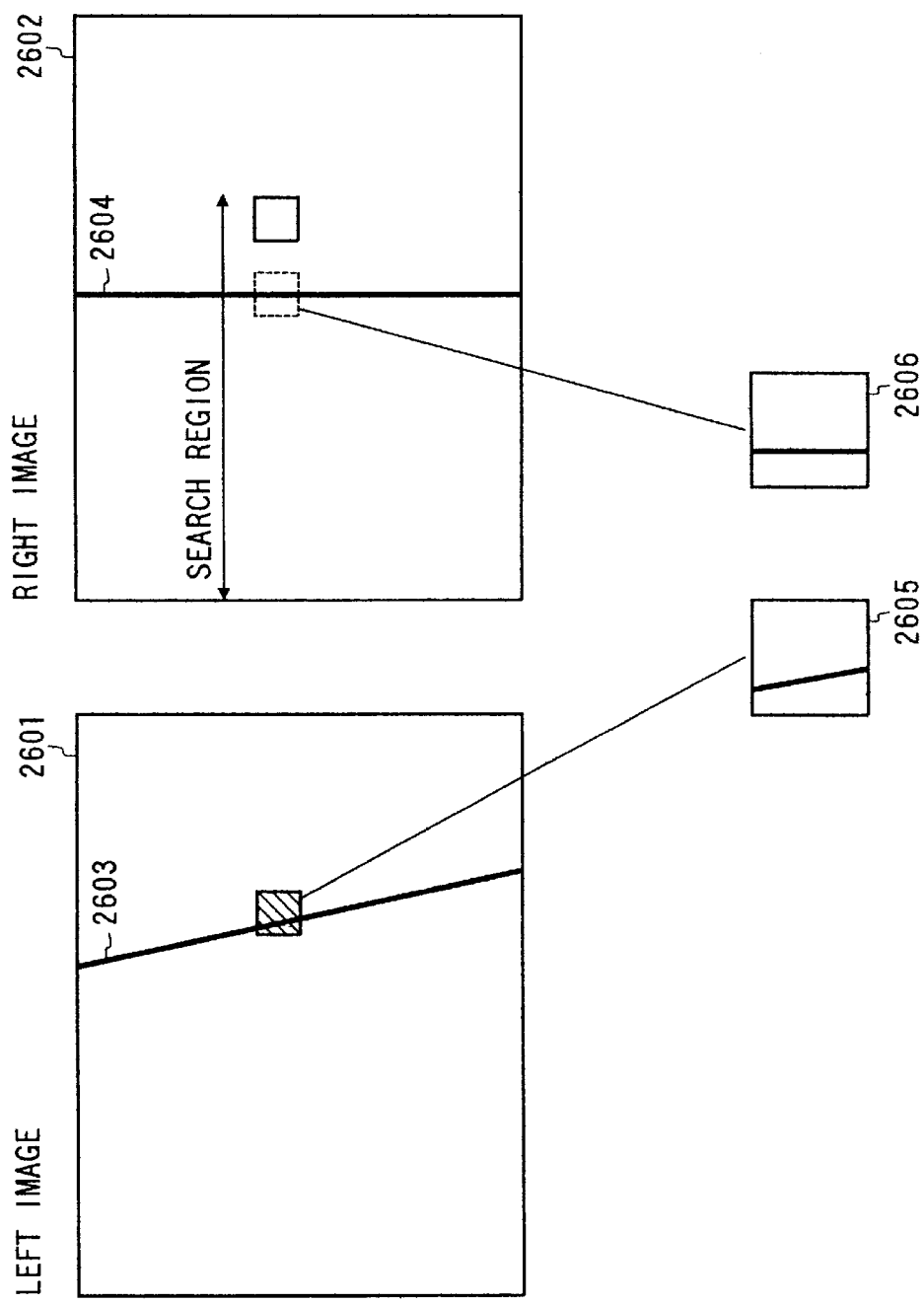
FIG. 4 is a view illustrating a problem in a conventional method.
Figure 5:
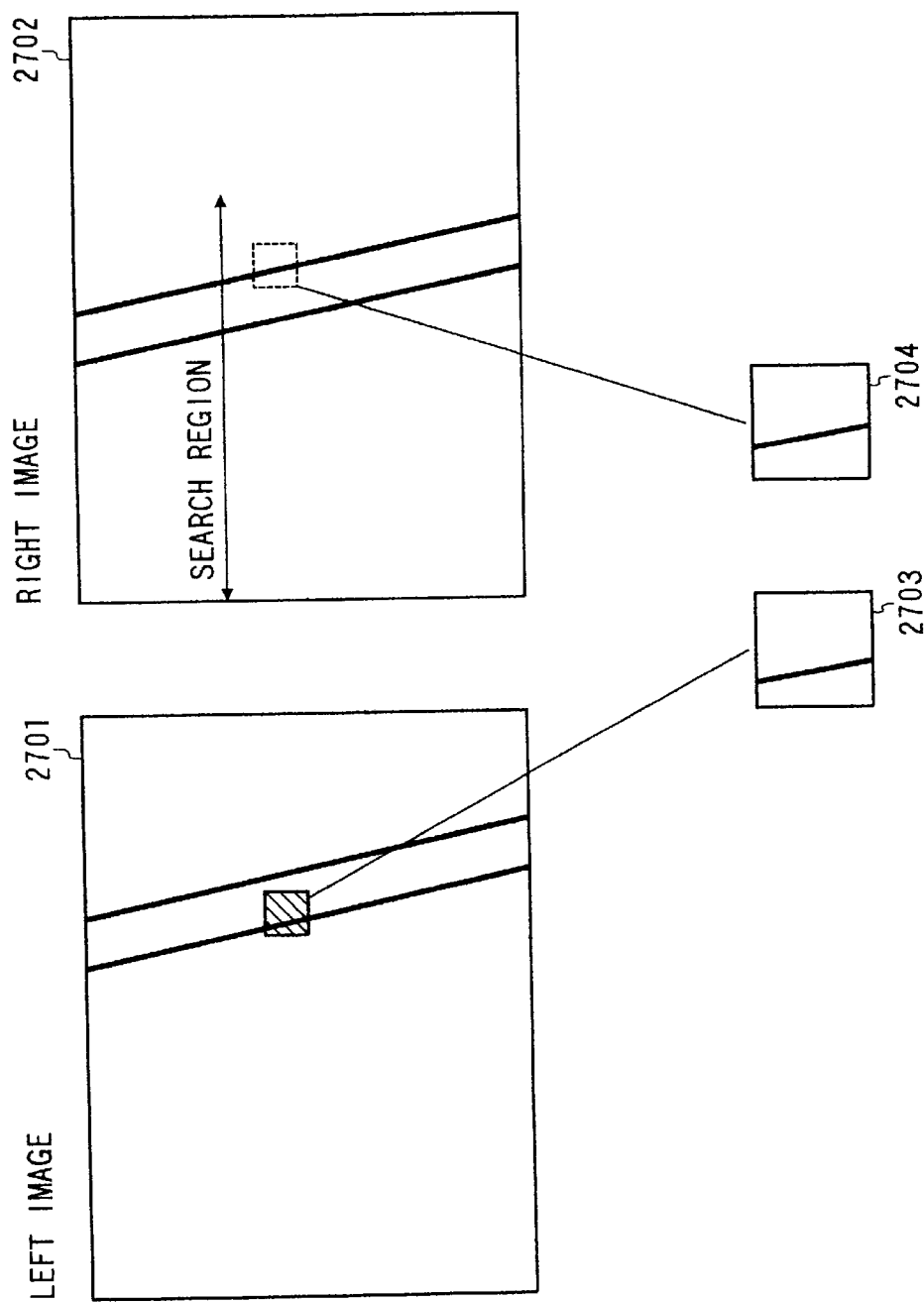
FIG. 5 is a view illustrating another problem in a conventional method.
Figure 6:
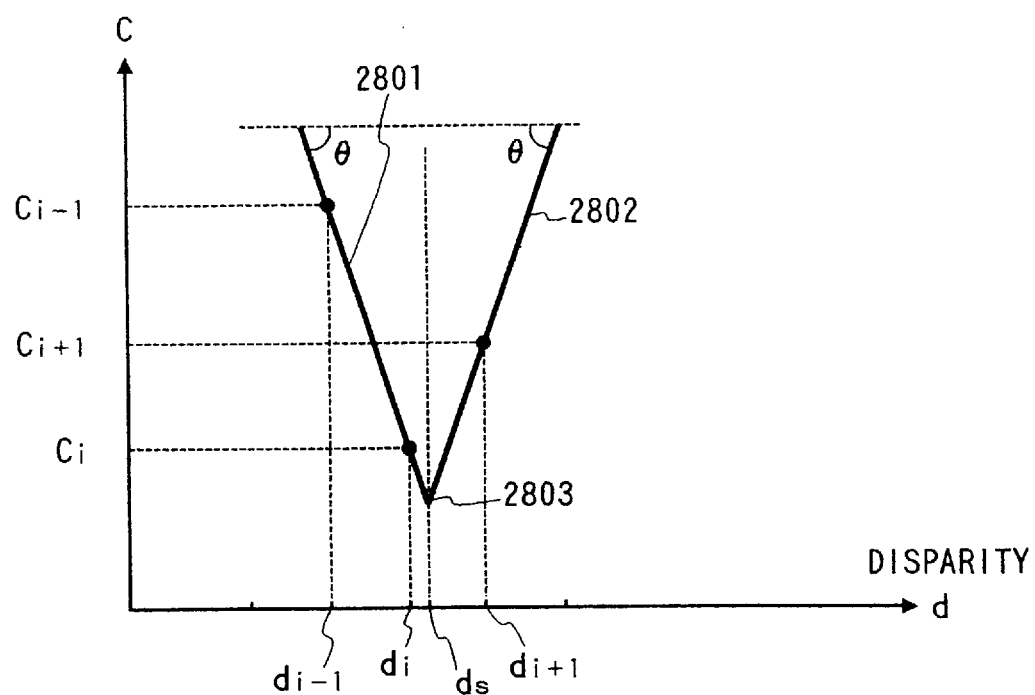
FIG. 6 is a view illustrating a detection of a sub-pixel level disparity in accordance with a conventional disparity detecting method.

Preferred embodiments of the present invention will be explained in greater detail hereinafter, with reference to the accompanying drawings. Identical parts are denoted by the same reference numeral throughout views.

A method of matching stereo images and a method of detecting a disparity between these images will be hereinafter explained in accordance with the present invention.

First Embodiment

A first embodiment will be explained based on a stereo image measurement using the method of matching stereo images and detecting disparity between the images in accordance with the present invention.

Figure 7:
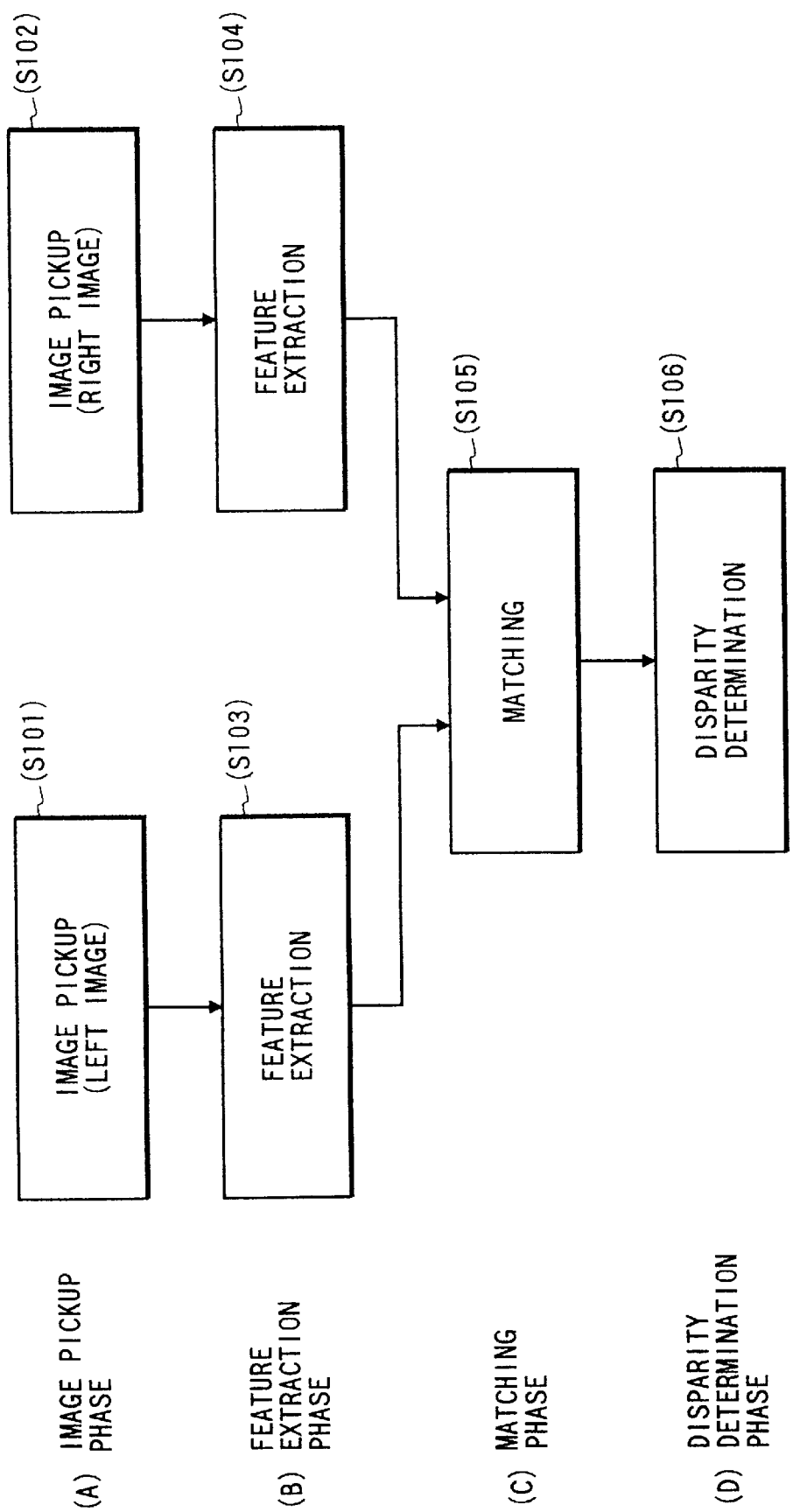
FIG. 7 is a flow diagram showing sequential processes for executing a first embodiment of the present invention, covering the pickup of stereo images through the determination of disparity.

FIG. 7 is a flow diagram showing sequential processes for executing the first embodiment of the present invention, covering the stereo image pickup phase through the disparity determination phase. In the image pickup phase (A), two, right and left, images are taken in through two, right and left, image-pickup devices in steps S101 and S102. Then, the right and left images, obtained in the image-pickup phase (A), are respectively subjected to feature extraction in the next feature extraction phase (B) in steps S103 and S104. Thereafter, in the succeeding matching phase (C), the extracted features of the right and left images are compared to check how they match with each other in step S105.

More specifically, in the matching phase (C), a one-dimensional window is set, this one-dimensional window is shifted along a referential image plane (one of right and left image planes) in accordance with a predetermined scanning rule so as to successively set windows each serving as the unit for matching stereo images, and a matching operation is performed by comparing the image features within one window and corresponding image features on the other (the other of right and left image planes).

Subsequently, in the disparity determination phase (D), the referential image feature plane is dissected or divided into plural blocks each having a predetermined size, a histogram in each block is created from disparities obtained by the matching operation based on one-dimensional windows involving pixels of a concerned block, and a specific disparity just corresponding to the peak of thus obtained histogram is identified as a valid disparity representing the concerned block in step S106. The processing performed in these phases (A) through (D) will be hereinafter described in greater detail.

A: IMAGE-PICKUP PHASE

Although there will be various methods for arranging the stereo cameras, this embodiment disposes a pair of right and left cameras in a parallel arrangement where two cameras are located at predetermined right and left positions in the horizontal direction so that they have paralleled optical axes. The right-and-left parallel arrangement explained with reference to FIG. 1 shows an ideal arrangement model to be adopted in this embodiment too. However, in practices, it will be impossible to perfectly build the ideal arrangement of stereo cameras without causing any dislocations. In this respect, it is important that the method of matching stereo images and the method of detecting a disparity between these images should be flexible for allowing such dislocations.

In the following explanation, the right and left images obtained in the image-pickup phase (A) will be explained as monochrome images having a predetermined size of 768 (H)×480 (V). However, it is needless to say that the images handled in the present invention are not limited to the disclosed monochrome images. The right and left images, obtained in the image-pickup phase, are defined as follows.

Left Image : IL (x, y)

Right Image : IR (x, y)

where $1 \leq x \leq 768$, $1 \leq y \leq 480$, $0 < IL(x,y) \leq 255$, and $0 \leq IR(x,y) \leq 255$.

Figure 8:
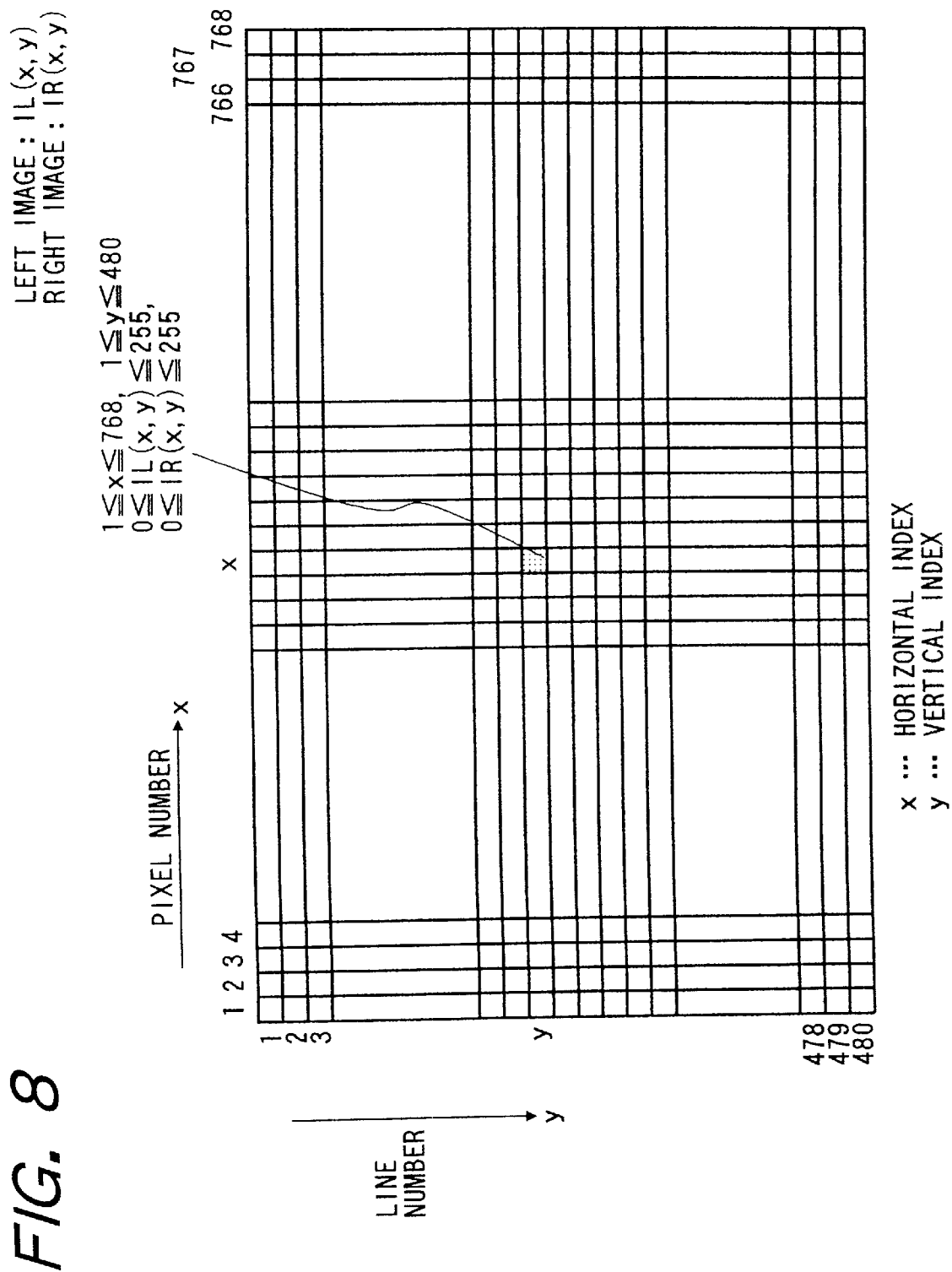
FIG. 8 is a view illustrating a monochrome image used in the explanation of one embodiment method of matching stereo images and of detecting disparity between these images in accordance with the present invention.

As shown in the monochrome image of FIG. 8, "x" represents a horizontal index of the image, while "y" represents a vertical index (i.e. line number) of the image. The pixel number is expressed by "x" from left to right, while the line number is expressed by "y" from top to bottom.

Figure 13:
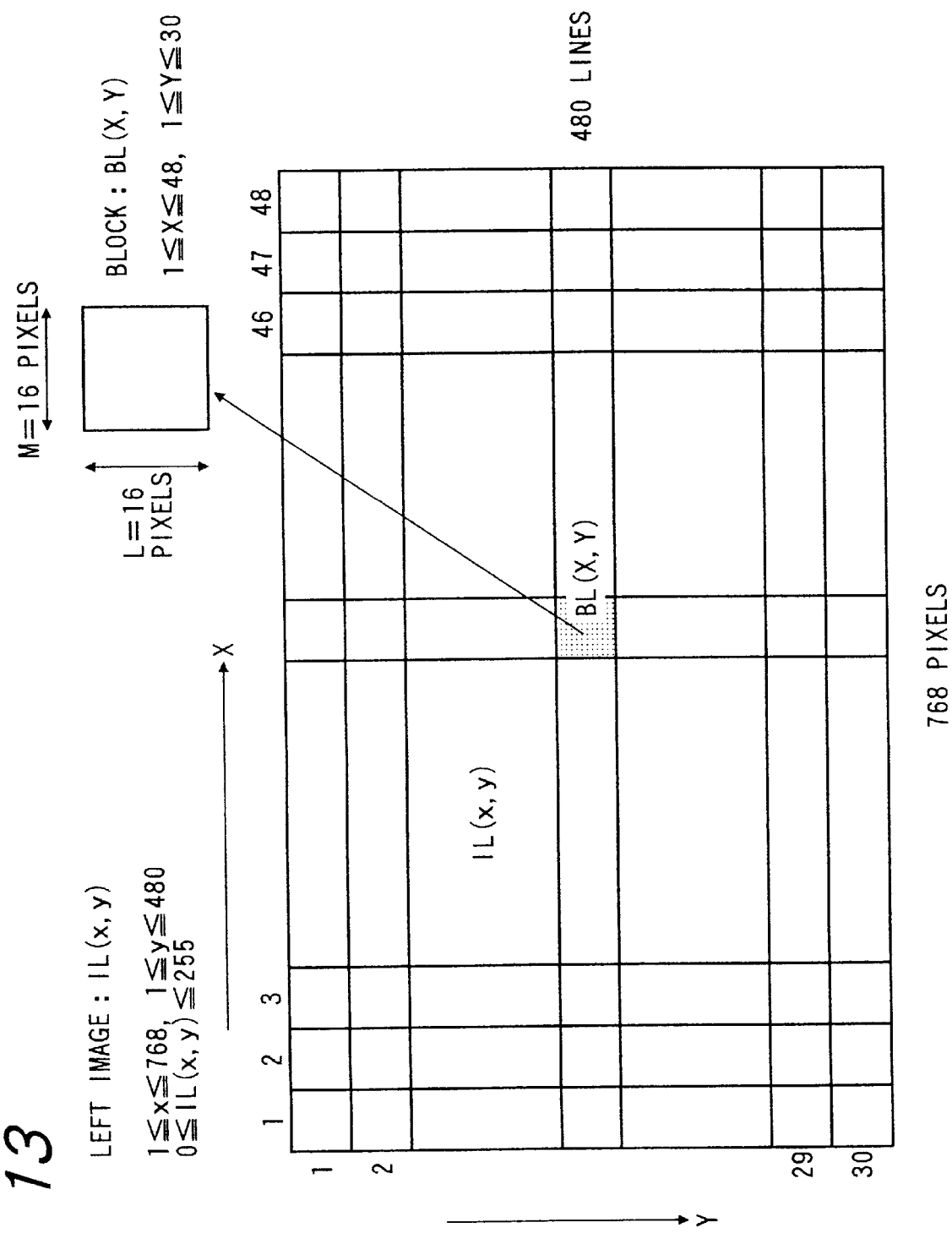
FIG. 13 is a view illustrating a method of dividing an image into plural blocks, each serving as the unit for determining disparity, in accordance with the present invention.

In performing the stereo image matching, one of two images is designated as a reference image and a matching region corresponding to a specific region of this reference image is searched from the other image. The left image, serving as the reference image in this embodiment, is dissected into numerous blocks each having a size of M×L pixels as shown in FIG. 13. As a practical example, each block has a size of 16×16 pixels (M=L=16). In this case, the left image is divided into a total of 48 pixels in the horizontal direction and a total of 30 pixels in the vertical direction, creating 1440 blocks in amount. Hereinafter, each block is discriminated by the following identification data BL(X,Y).

Block ID : BL(X,Y), where $1 \leq X \leq 48$, $1 \leq Y \leq 30$

B: Feature Extraction Phase

The two images, right image IR and left image IL, obtained in the image pickup phase (A), are developed into a plurality of frequency component images in the feature extraction phase (B)

IL: L1, L2, L3, - - - , Lk, Lk+1, - - - , Ln
IR: R1, R2, R3, - - - . Rk, Rk+1, - - - , Rn

Each frequency-component image is applied the secondary differential processing. Thereafter, each image is converted pixel by pixel into ternary values, thus obtaining the following ternary-valued frequency component images.

TL1, TL2, TL3, - - - , TLk, TLk+1, - - - , TLn
TR1, TR2, TR3, - - - , TRk, TRk+1, - - - , TRn

The above-described operation makes it possible to extract edges at various resolutions. The primary object to perform the above-described operation is as follows.

Basically, each edge position receives no adverse effect derived from sensitivity difference between two cameras or shading. By utilizing this preferable nature, it becomes possible to accurately perform the stereo image matching without performing any pre-processing, such as sensitivity difference correction of cameras or shading correction. The provision of ternary-value processing makes it possible to perform the similarity evaluation by -using a compact hardware arrangement.

The secondary object is as follows.

Low-frequency edges are robust against noises, but are inaccurate in their positions. On the other hand, high-frequency edges are accurate in their positions, although they have a tendency of being adversely effected by noises. By utilizing these natures, it becomes possible to realize a robust and accurate stereo image matching.

Figure 12:
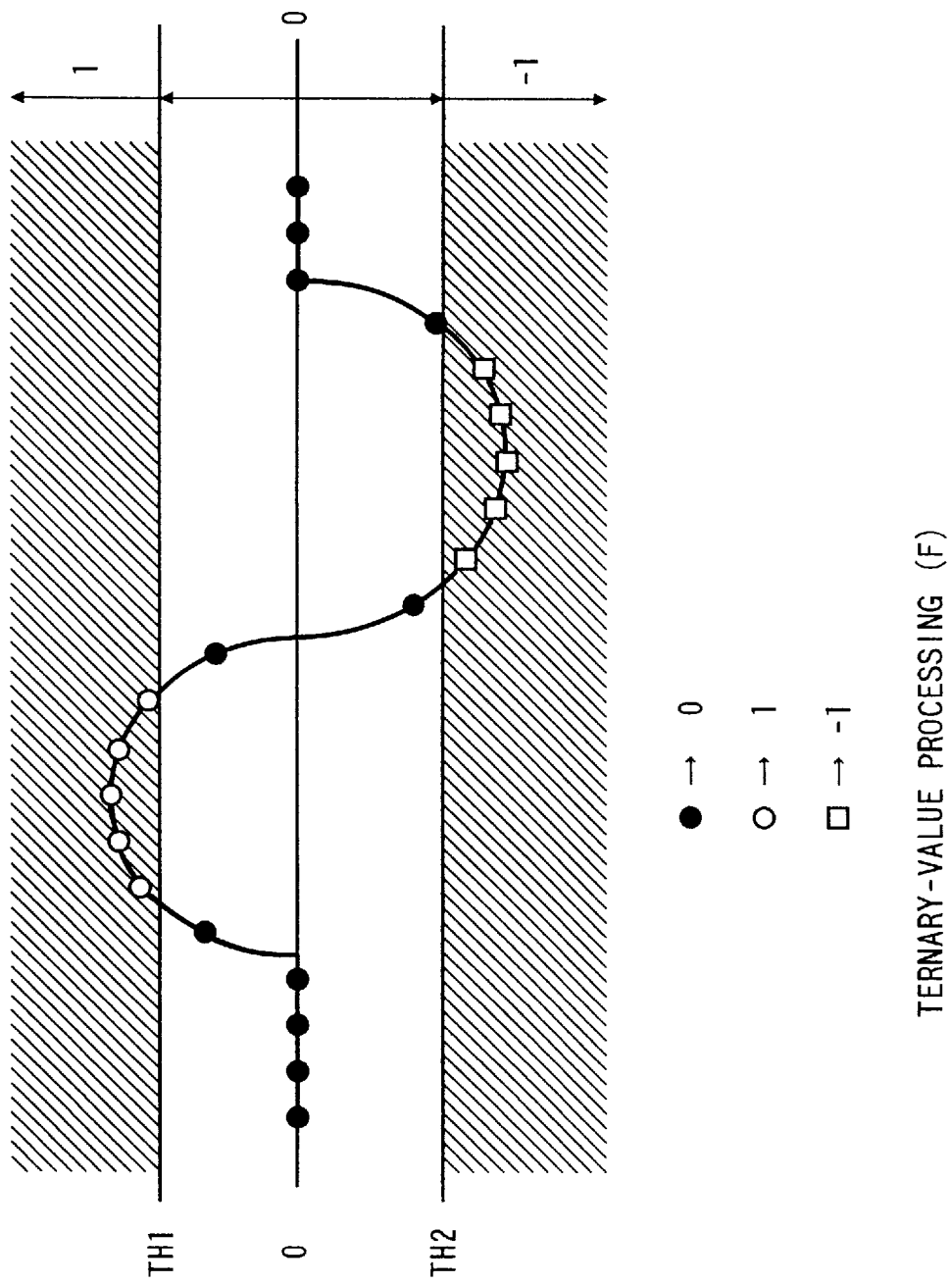
FIG. 12 is a view illustrating a method of transforming or quantizing the frequency component images into ternary values used in the first and third embodiment of the present invention.

Next, the ternary-value processing will be explained. FIG. 12 is a view illustrating a method of transforming or quantizing the frequency component images into ternary values used in the first and third embodiment of the present invention. As shown in FIG. 12, a positive threshold TH1 (>0) and a negative threshold TH2 (<0) are provided to classify all of frequency component images into three values. For example, ternary values are given to respective pixels as follows.

Less than $TH2$      −1
Not smaller than $TH2$ but smaller than $TH1$      0
Not smaller than $TH1$      1

The above-described ternary-value processing makes it possible to quantize the images into 1 or −1 at their edges, especially in the vicinity of (positive and negative) peak positions, otherwise the images are expressed by 0. This ternary-value processing is characterized in that its circuit can be simply arranged and relatively robust against noises. However, if any sensitivity difference exists between right and left images IR and IL, there will be the possibility that some pixels near the threshold may cause erroneous edge-position information due to quantization error.

Figure 9:
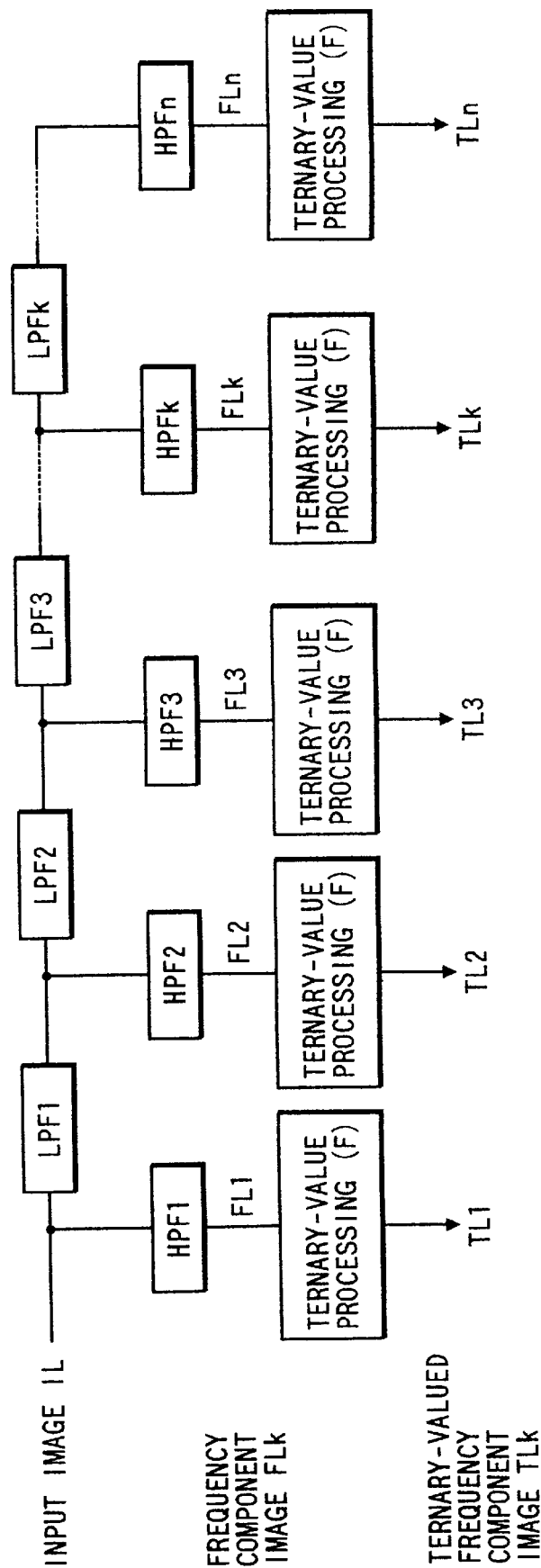
FIG. 9 is a block diagram showing an arrangement of a first apparatus which realizes the processing of feature extraction phase (B) of FIG. 7.
Figure 10A:
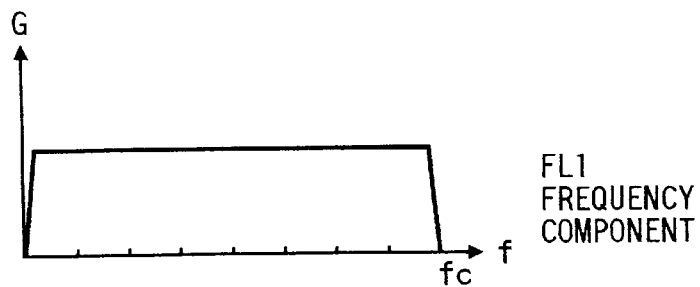
FIGS. 10A, 10B, 10C and 10D are graphs showing examples of various frequency component images obtained as a result of the feature extraction phase processing shown in FIGS. 9, 23 and 27.
Figure 10B:
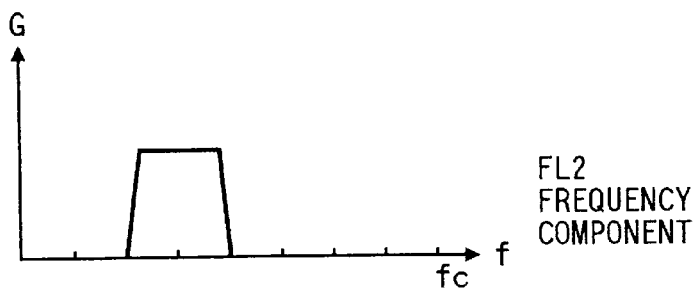
Figure 10C:
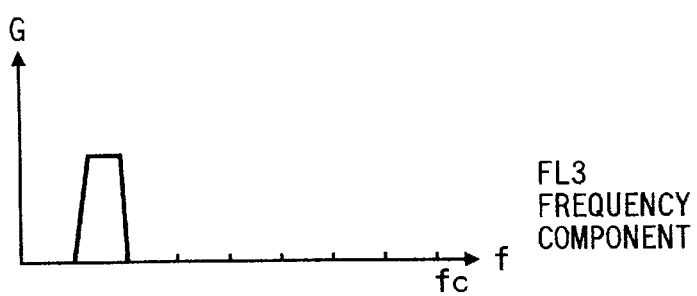
Figure 10D:
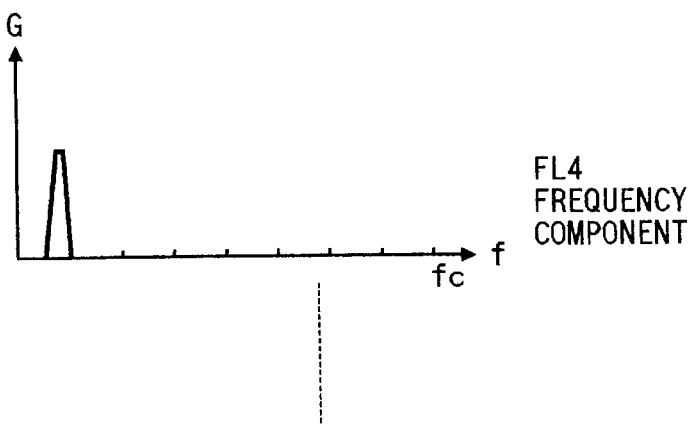

FIG. 9 is a block diagram showing the arrangement of a first apparatus which realizes the processing of feature extraction phase (B) of FIG. 7. Left image IL (or right image IR), received in the feature extraction phase (B), is the left image IL (or right image IR) obtained in the image-pickup phase (A) which is band limited to fc (Hz). The input image IL is developed into a plurality of band signals having different frequency components (i.e. frequency component images FLk, k=1,2,3, - - - ,n) by plural low-pass filters (LPFk, k=1,2,3, - - - ) and high-pass filters (HPFk, k=1,2, 3, - - - , n) combined as shown in the drawing. Then, each band signal is quantized into a ternary value (i.e. ternary-valued frequency component image TLk, k=1,2,3, - - - ,n) through the succeeding ternary-value processing (F). The above-described HPFk is a high pass filter having a secondary differential function. FIGS. 10A, 10B, 10C and 10D are graphs showing examples of various frequency component images FLk (k=1,2,3, - - - ), i.e. band division examples, obtained as a result of the development using the circuit shown in the block diagram of FIG. 9.

Each of these plural ternary-valued frequency component image TLk, thus obtained, reveals an edge position involved in each frequency component image. Each edge position is used for the matching of right and left images in the succeeding matching phase (C). Regarding the settings, it is noted that the number of frequency component images FLk or the width of each frequency band should be determined by taking the required performance and the allowable cost range into consideration.

Figure 11:
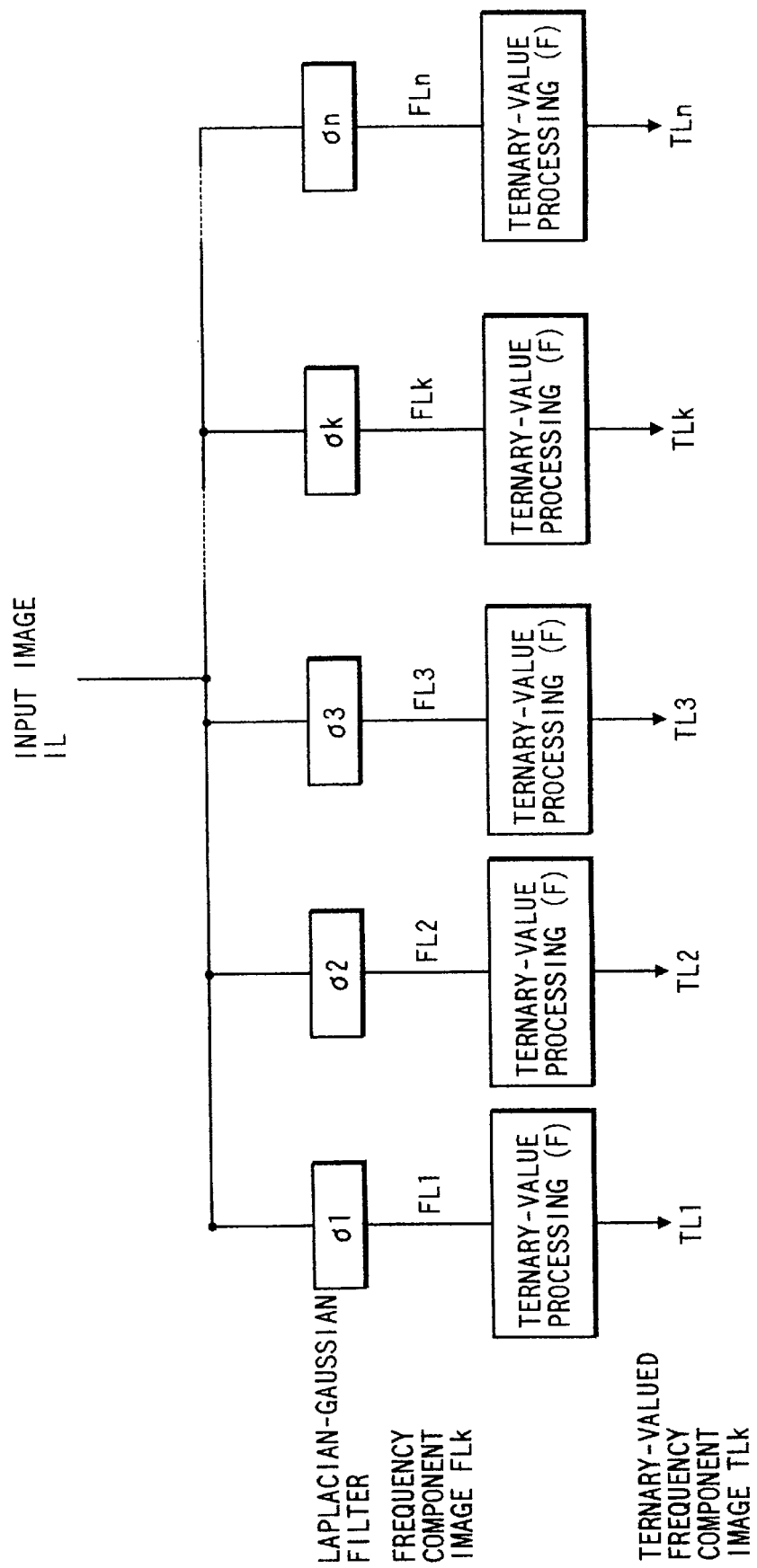
FIG. 11 is a block diagram showing an arrangement of a second apparatus which realizes the processing of feature extraction phase (B) of FIG. 7.

FIG. 11 is a block diagram showing the arrangement of a second apparatus which realizes the processing of feature extraction phase (B) of FIG. 7. The Laplacian-Gaussian function ($\nabla^2 G$), forming the basis for "σ" of Laplacian-Gaussian filter, is given by taking a second-story differential of Gaussian function. In a one-dimensional case:

$$\nabla^2 G(x) = \frac{1}{\sqrt{(2\pi)\sigma}} \left( \frac{x^2 - \sigma^2}{\sigma^4} \right) \exp\left( -\frac{x^2}{2\sigma^2} \right) \quad \text{(Eq. 8)}$$

In a two-dimensional case:

$$\nabla^2 G(i,j) = \frac{1}{\pi\sigma^4} \left( 1 - \frac{r^2}{2\sigma^2} \right) \exp\left( -\frac{r^2}{2\sigma^2} \right) \quad \text{(Eq. 9)}$$

where $r^2 = i^2 + j^2$, and $\sigma^2$ represents the variance of Gaussian function.

Obtaining a convolution of this function and the image (Laplacian-Gaussian filter) is equivalent to smoothing the image through the Gaussian filter (LPF) and then obtaining a second-story differential (Laplacean, HPF).

Changing the value of a will make it possible to extract edges at a plurality of resolutions (scales), which is widely applicable to the image processing technologies.

With the above-described method, the image is developed into a plurality of frequency component images which are then quantized into ternary-valued frequency component images as follows.

Left ternary-valued frequency component image:
TL1(x,y), TL2(x,y), TL3(x,y)
Right ternary-valued frequency component image:
TR1(x,y), TR2(x,y), TR3(x,y)
where $1 \leq x \leq 768$, $1 \leq y \leq 480$, $-1 \leq TL1(x,y)$, $TL2(x,y)$, $TL3(x,y)$, - - - $\leq 1$, and $-1 \leq TR1(x,y)$, $$TR2(x,y), TR3(x,y), \text{ - - - } \leq 1 \quad \text{(Eq. 10)}$$

Thus obtained right and left ternary-valued frequency component images are sent to the succeeding matching phase (C) and used to check the matching of stereo images.

C: Matching Phase

In the matching phase, matching of right and left images is performed using the plurality of ternary-valued frequency component images obtained through ternary-value processing in the feature extraction phase (B). One of two stereo images is designated as a reference image in this matching operation, and a matching region of a specific region of the reference image is searched from the other image.

Figure 14:
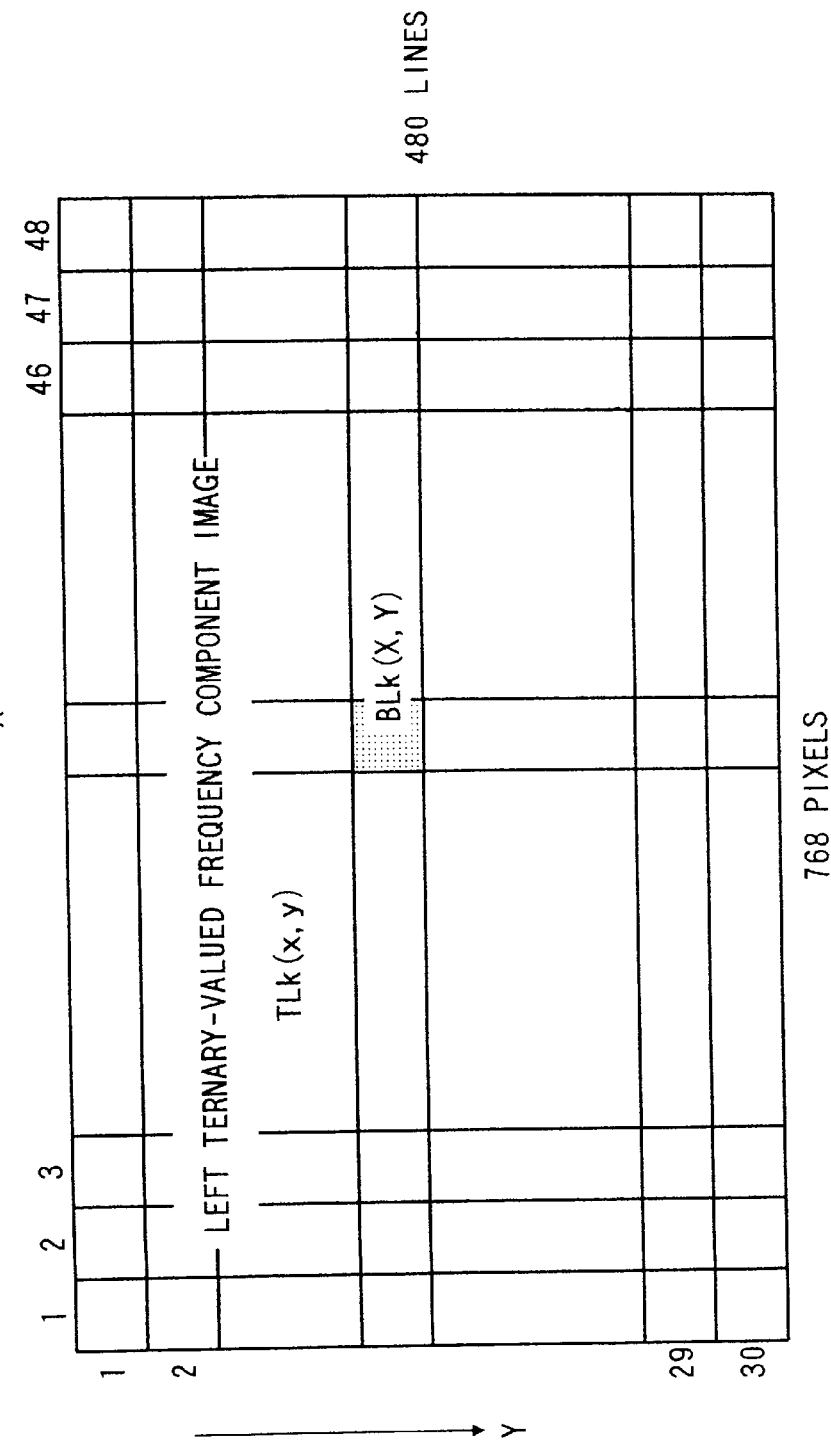
FIG. 14 is a view illustrating a scanning method of a one-dimensional window serving as the unit for matching stereo images in the present invention.

As explained in the image-pickup phase (A), this embodiment designates the left image as the reference image. Like the left image, serving as the reference image, which is dissected into numerous blocks each having the same size of M×L pixels as shown in FIG. 13, each of left ternary-valued frequency component images TLk is dissected into numerous blocks as shown in FIG. 14. Hereinafter, block identification data BLk(X,Y) is used for discriminating the left ternary-valued frequency component image TLk.

Block ID : BLk(X,Y), where $1 \leq X \leq 48$, $1 \leq Y \leq 30$

The matching operation of this embodiment is carried out along the odd number lines only. A scanning line is referred to as an objective scanning line when it is an object of the matching operation, hereinafter. All the information relating to the even number lines are not used at all in the matching phase and the succeeding.

First, as shown in FIG. 14, there is provided a one-dimensional window having a size of 1×16 pixels (i.e. L=1, M=16) for performing a window scan along a concerned odd number line (i.e. along one of objective scanning lines) of the left ternary-valued frequency component image TLk(x, y). Each stroke of the one-dimensional window scan is 8 pixels which is just a half (M/2) of the window size (16 pixels). In other words, the above-described window is shifted in the x direction by an amount identical with a half thereof so as to carry out the window scan by successively overlapping the area occupied by the window. This scanning operation provides a total of 95 windows successively overlapped along one objective scanning line.

A matching candidate region corresponding to each of one-dimensional windows thus provided is searched from the right ternary-valued frequency component image TRk (x,y). Each of one-dimensional windows is specified by identification data WNk(I,J).

Window ID : WNk(I,J), where $1 \leq I \leq 95$ and $1 \leq J \leq 240$

Figure 15:
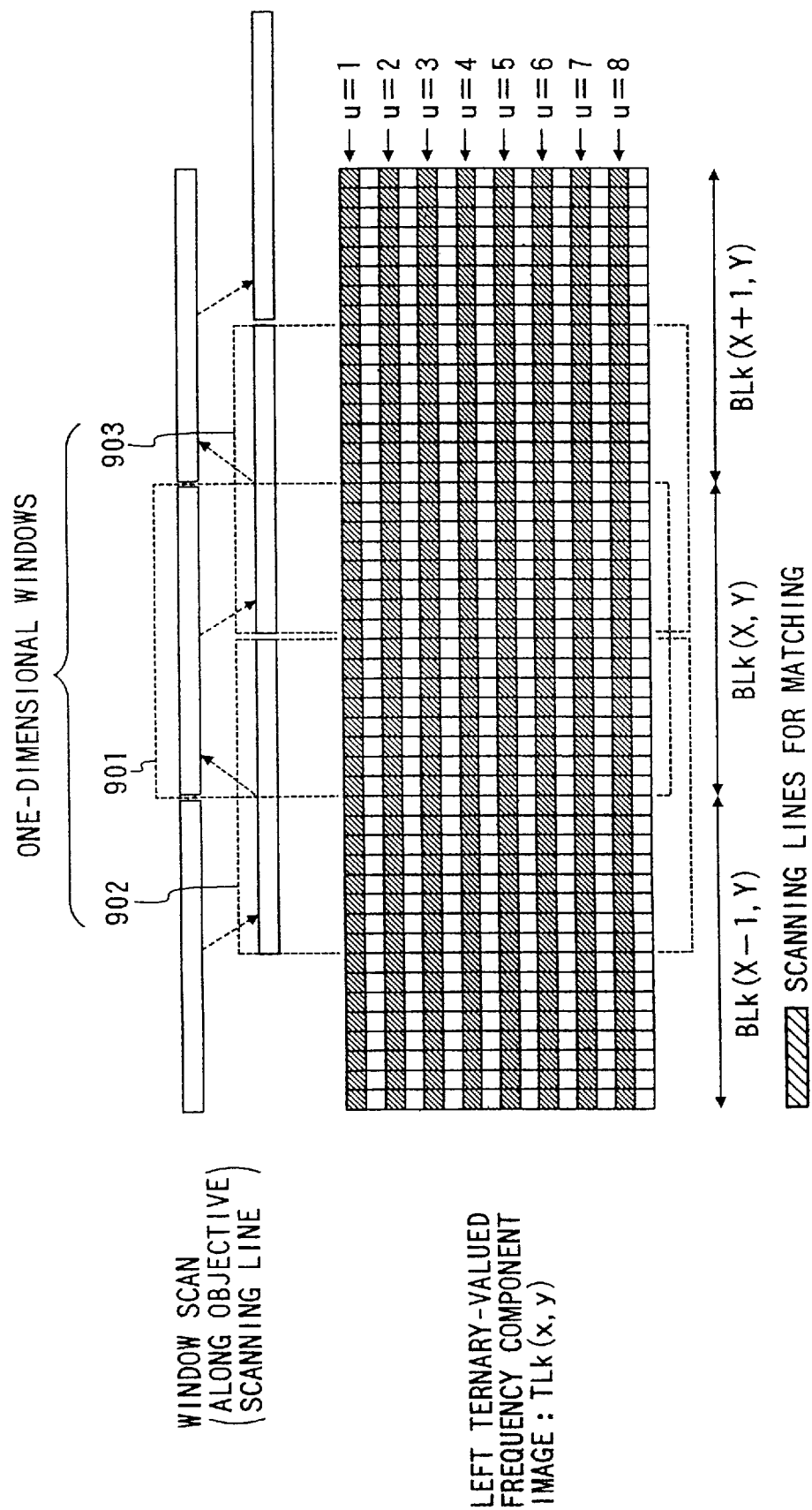
FIG. 15 is a view illustrating the relationship between the one-dimensional window serving as the unit for matching stereo images and a block serving as the unit for determining a disparity in the present invention.

As shown in FIG. 15, a block BLk(X,Y) completely involves a total of 8 one-dimensional windows 901, which are generally expressed by the following equation using the block indexes X and Y.

$$Wnk(I,J)=WNk(2X-1, 8(Y-1)+u), \text{ where } 1 \leq u \leq 8 \quad \text{(Eq. 11)}$$

Meanwhile, there are existing a total of 8 one-dimensional windows 902 each bridging 8 (M/2) pixels of block BLk(X,Y) and 8 (M/2) pixels of block BLk(X−1,Y). These one-dimensional windows 902 are generally expressed by the following equation.

$$Wnk(I,J)=WNk(2X-2, 8(Y-1)+u), \text{ where } 1 \leq u \leq 8 \quad \text{(Eq. 12)}$$

On the other hand, there are existing a total of 8 one-dimensional windows 903 each bridging 8 (M/2) pixels of block BLk(X,Y) and 8 (M/2) pixels of block BLk(X+1,Y). These one-dimensional windows 903 are generally expressed by the following equation.

$$Wnk(I,J)=WNk(2X, 8(Y-1)+u), \text{ where } 1 \leq u \leq 8 \quad \text{(Eq. 13)}$$

As apparent from the foregoing description, this embodiment is characterized by one-dimensional windows each serving as the unit for the matching operation. The purpose of using such one-dimensional windows is to reduce the size of hardware compared with the conventional two-dimensional window, and also to shorten the processing time as a result of reduction of accesses to the memories.

Furthermore, this embodiment is characterized in that one-dimensional windows are successively arranged in an overlapped manner at the same intervals of 8 (M/2) pixels. The purpose of adopting such an overlap arrangement is to enhance the reliability of each matching operation by allowing the supplementary use of adjacent pixels in the event that the matching region cannot be univocally determined based on only the pixels in a given block, when the disparity of the block is determined.

Figure 16:
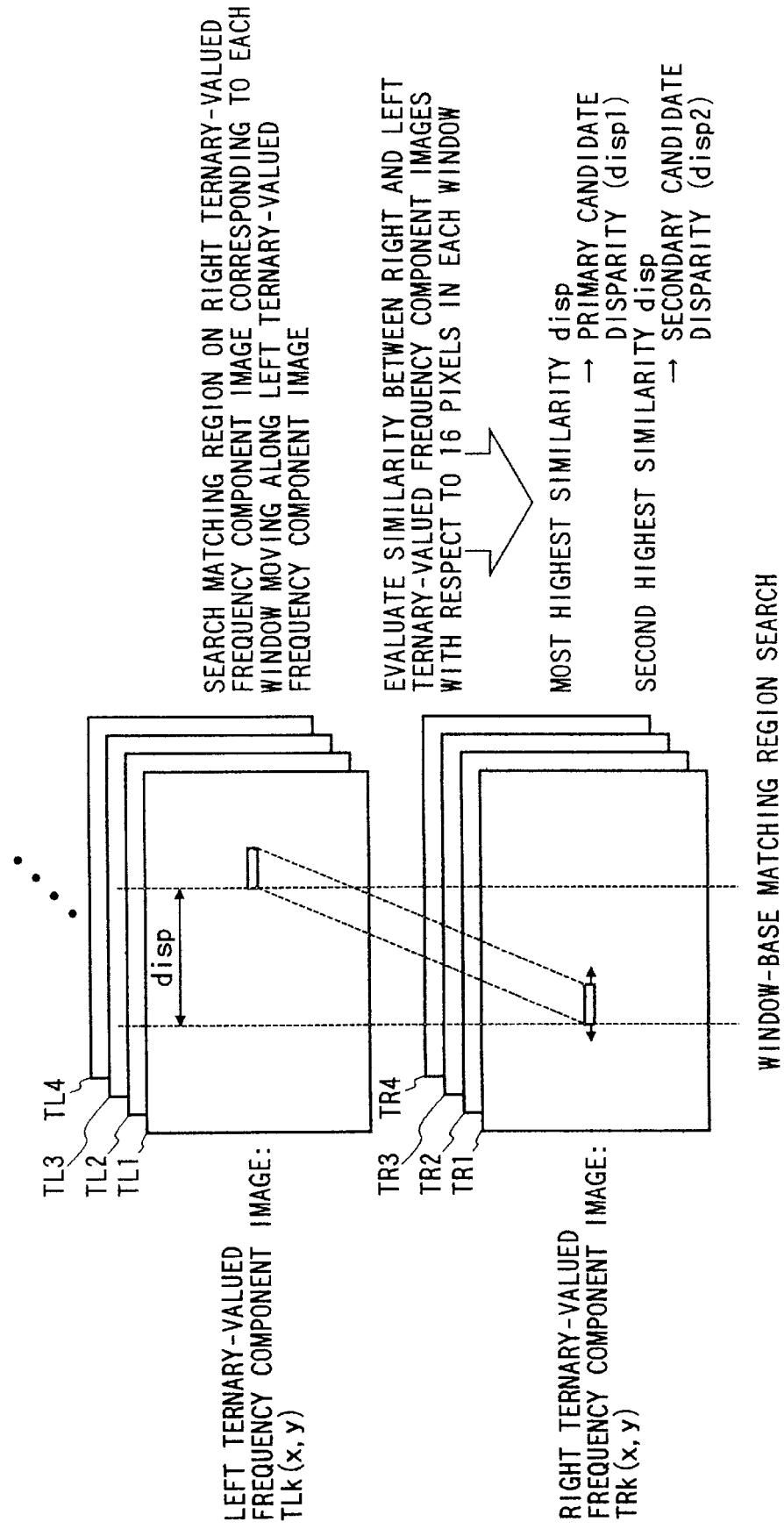
FIG. 16 is a view illustrating a method of determining a disparity candidate based on the one-dimensional window search of the present invention.

Next, a method of determining a matching region of each of the one-dimensional windows thus provided will be explained. As shown in FIG. 16, a matching region of each one-dimensional window being set on the left ternary-valued frequency component image TLk is searched from the right ternary-valued frequency component image TRk.

In the search, the previously-described equation 8 is used to evaluate the similarity between right and left ternary-valued frequency component images TLk and TRk involved in the designated one-dimensional windows. With respect to each of one-dimensional windows, a region having the most highest similarity is specified as a primary candidate disparity (disp1) and a region having the second highest similarity is specified as a secondary candidate disparity (disp2).

These primary and secondary candidate disparities, obtained in the above-described matching operation based on one-dimensional windows are mere candidates and are not the final disparity. The final disparity of each block is determined in the succeeding disparity determination phase (D) based on these primary and secondary candidate disparities.

Next, a method of evaluating similarity will be explained in more detail, with reference to FIG. 17. In the evaluation of similarity, all of 16 pixels in a given one-dimensional window on the left ternary-valued frequency component image TLk are compared with consecutive 16 pixels arrayed in the horizontal direction within a predetermined zone on the right ternary-valued frequency component image TRk, this predetermined zone having the possibility of detecting a matching region.

More specifically, the similarity between corresponding two pixels is evaluated using the following codes.

| | |
|---|---|
| Both pixels valued 0 | Z |
| Both pixels valued 1 | P |
| Both pixels valued −1 | P |
| Other cases | 0 |

The coding operation for evaluating the similarity (i.e. evaluation between corresponding pixels) is carried out with respect to all of 16 pixels in the given one-dimensional window. In this manner, all of ternary-valued frequency component images TLk and TRk are applied the evaluation of similarity, finally obtaining the overall similarity evaluation result as follows.

$$Eall = \Sigma \beta k(PN)k + \Sigma \gamma k(ZN)k \quad \text{(Eq. 14)}$$

where PN represents a total number of pixels having the evaluation result "P", ZN represents a total number of pixels having the evaluation result "Z", and βk and γk represent weighting factors.

Having a large value in the overall similarity evaluation result Eall indicates that the similarity is high. Although "k" represents consecutive integers 1,2, - - - ,n in the equation 14, it is possible to use some of them. Furthermore, the first term on the right side of the equation 14 expresses the number of pixels coinciding with each other with respect to the edge points serving as matching features. It is believed that this number reflect the reliability in the result of matching operation. The larger this number, the higher the reliability. The smaller this number, the lower the reliability.

Accordingly, if the first term on the right side is smaller than a predetermined threshold TH3 in the similarity evaluation result based on the primary candidate disparity, this candidate disparity should be nullified or voided in order to eliminate any erroneous matching operations.

Figure 18:
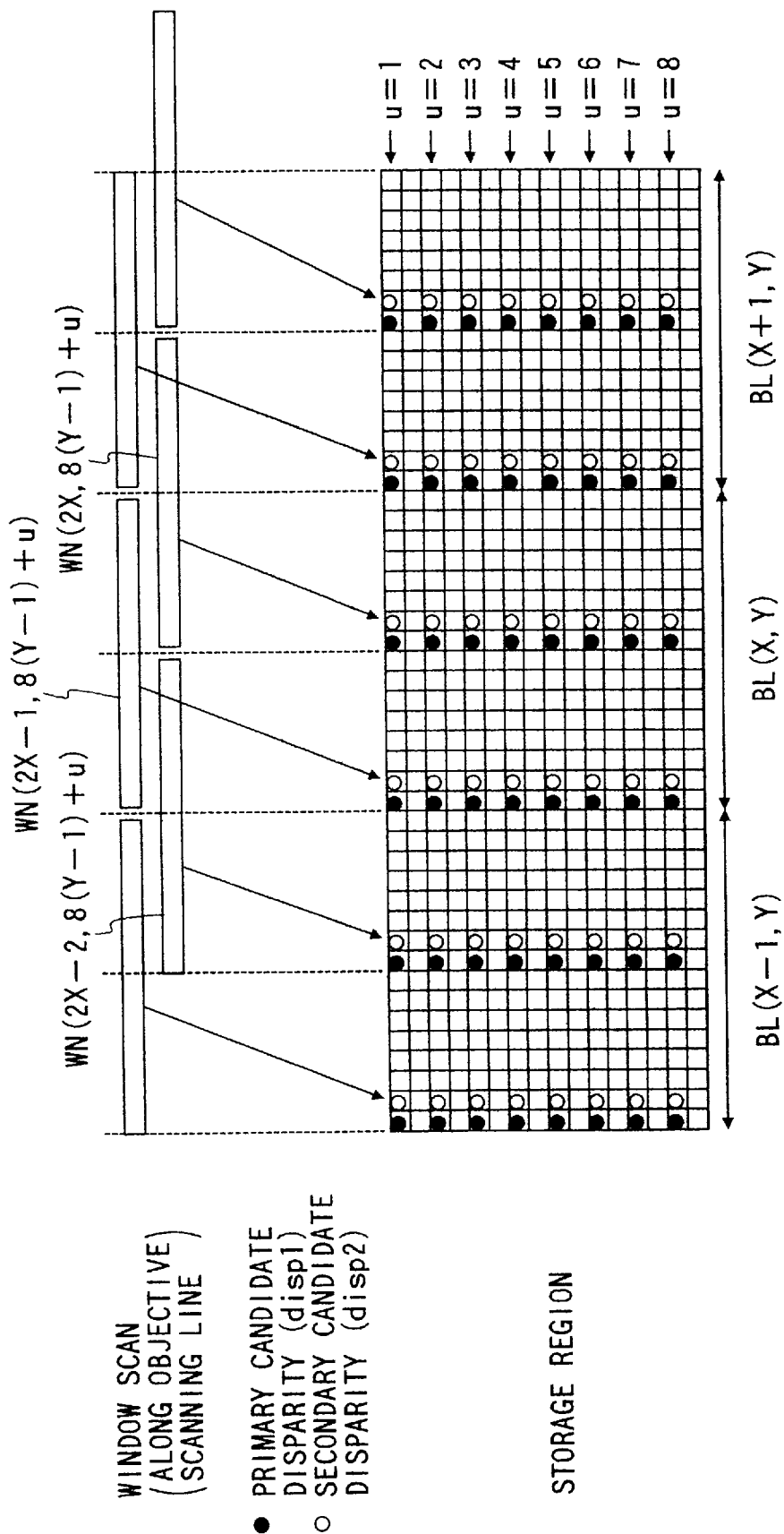
FIG. 18 is a view illustrating an example of a storage region used for temporarily storing candidate disparities which are determined in relation to each of one-dimensional windows in accordance with the present invention.

Numerous primary candidate disparities (disp1) and secondary candidate disparities (disp2) will be obtained as a result of the scan based on a one-dimensional window successively shifted at strokes of 8 (M/2) pixels in an overlapped manner along the odd number line of the left image. The primary candidate disparities (disp1) and secondary candidate disparities (disp2), thus obtained, are stored in the predetermined regions of a storage memory shown in FIG. 18. Although FIG. 18 shows the memory regions in one-to-one relationship to the image data, it is noted that vacant regions in the storage memory can be eliminated. D: Disparity Determination Phase In the disparity determination, a disparity in each of blocks (totaling 1440 blocks) is finally determined based on the primary candidate disparities (disp1) and the secondary candidate disparities (disp2) determined with respect to each of one-dimensional window.

Figure 19:
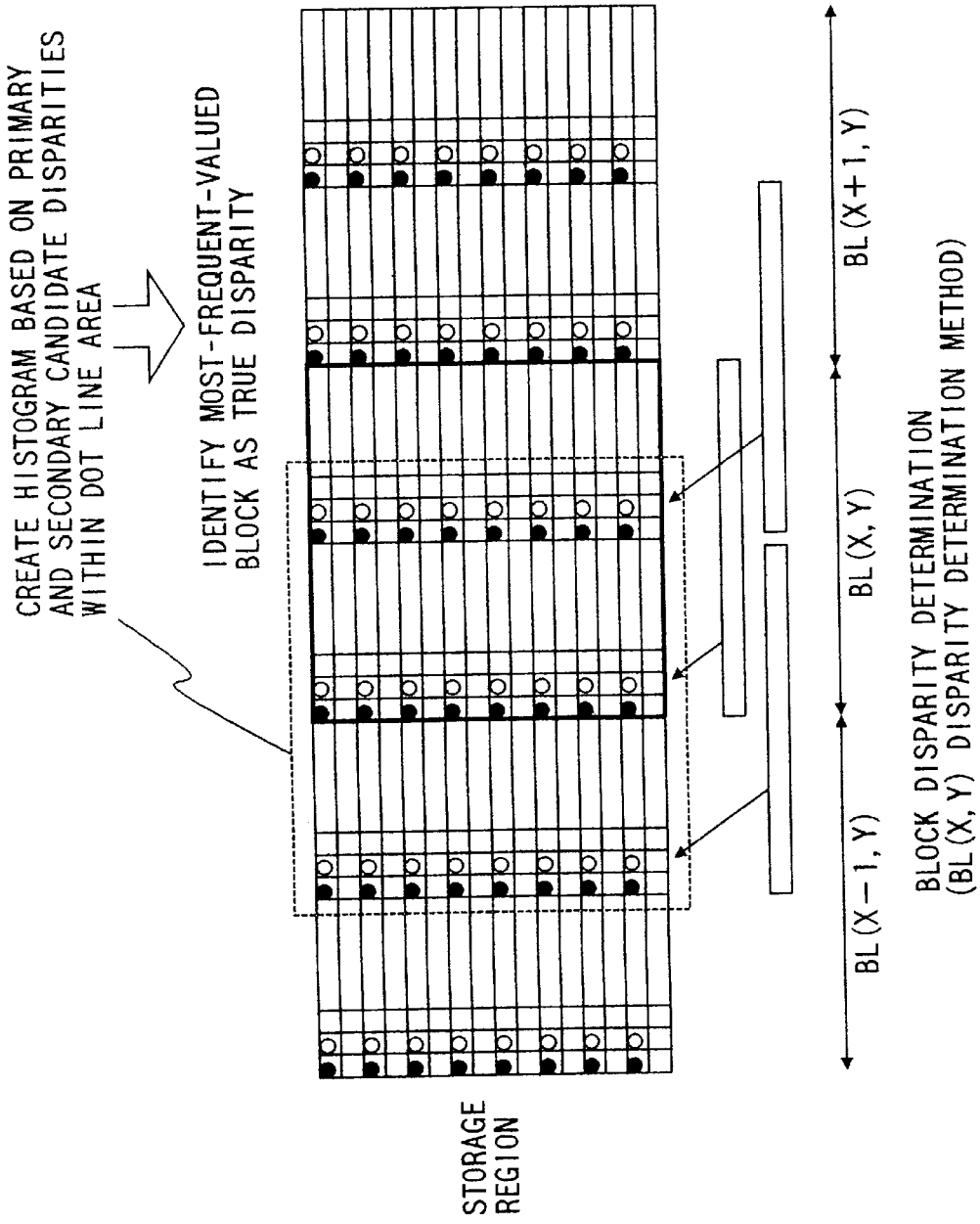
FIG. 19 is a view illustrating a method of creating a histogram in relation to blocks, based on candidate disparities temporarily stored in the storing region in relation to one-dimensional windows, in accordance with the present invention.
Figure 20:
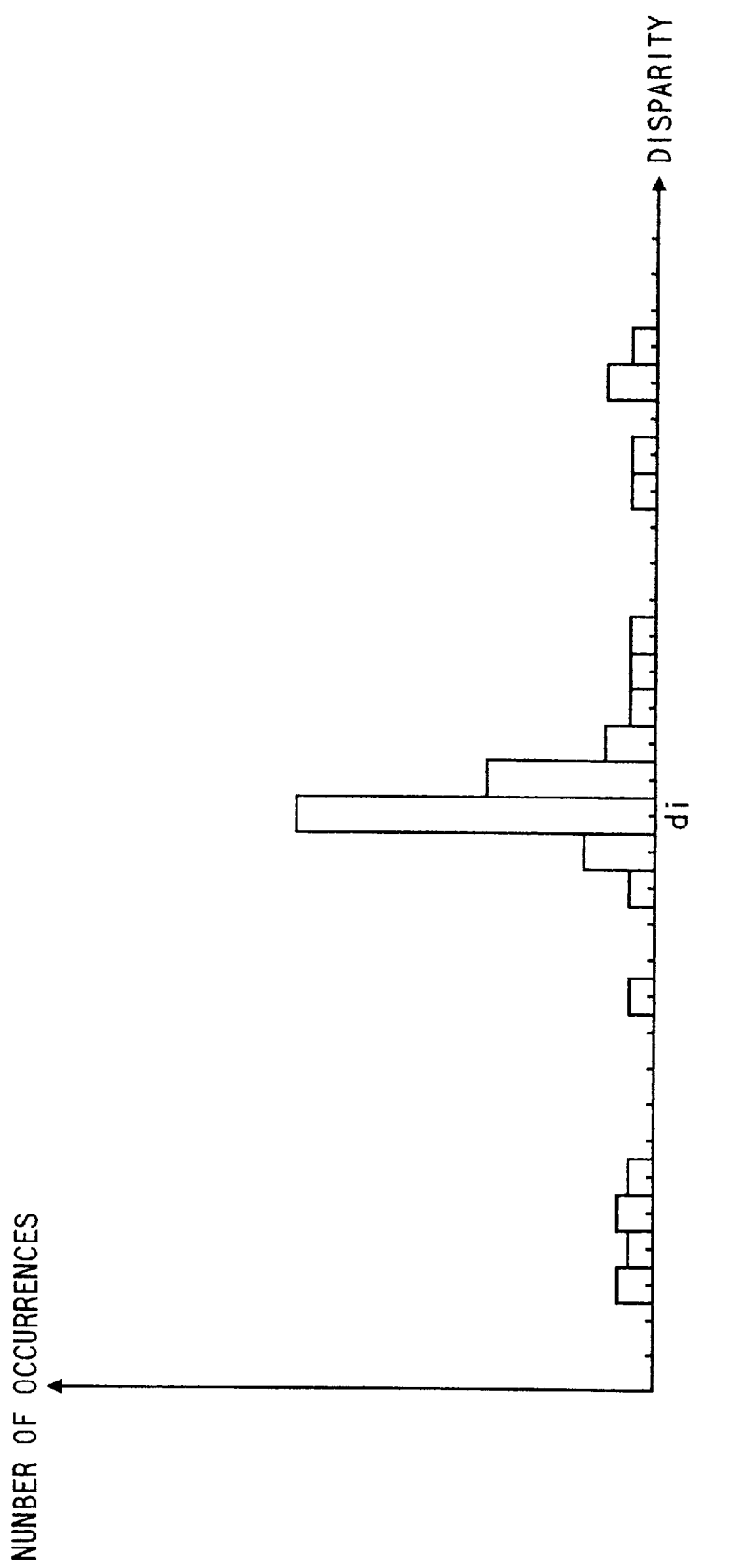
FIG. 20 is a graph showing an example of the histogram created in each block in accordance with the present invention.

A method of determining a disparity of each block will be explained with reference to FIG. 19, which explains how the disparity of block BL(X,Y) is determined. To determine a disparity of block BL(X,Y), a histogram is created based on a total of 24 sets of primary candidate disparities (disp1) and secondary candidate disparities (disp2) existing in the region encircled by a dotted line in FIG. 19, considering the fact that all of these selected primary and secondary candidate disparities are obtained through the matching operation of the specific one-dimensional windows each comprising at least 8 pixels existing in the region of block BL(X,Y). FIG. 20 is a graph showing an example of the histogram of disparities created based on the primary and secondary candidate disparities.

Then, a disparity having the largest number of occurrences is finally determined as the disparity of block BL(X, Y).

Returning to the second example of prior art methods, the characteristic point was that, after the image is dissected into a plurality of blocks, the similarity evaluation for the matching was independently performed in each block using only the pixels existing in this concerned block. Hence, there was the possibility of causing a mismatching due to the accidental presence of similar but different plural regions. And, the mismatching was a direct cause of the failure in the detection of disparity for each block.

However, according to the disparity detecting method of the present invention, these problems are completely solved. That is, the present invention is characterized in that a histogram is created in each block using the matching data resultant from the setting of a plurality of one-dimensional windows successively overlapped, and then the disparity of the concerned block BL(X,Y) is determined by detecting the peak position in the histogram. Hence, even if an erroneous matching may arise in the matching operation performed with respect to each of one-dimensional windows (i.e. even if an erroneous candidate disparity is accidentally detected), the present invention is sufficiently flexible to absorb or correct such an error.

Furthermore, as a superior effect of using overlapped one-dimensional windows, it becomes possible to supplementarily use the pixels existing out of the concerned block in the determination of disparity. This will surely prevent the failure in the detection of disparity even if similar but different regions are accidentally measured.

In general, in this kind of disparity detecting method, the image is obtained as digital data sampled at a predetermined frequency. Hence the measurable minimum unit for the disparity is limited to one pixel. If high accuracy in the disparity measurement is strictly requested, the following sub-pixel level measurement will be available.

Figure 21:
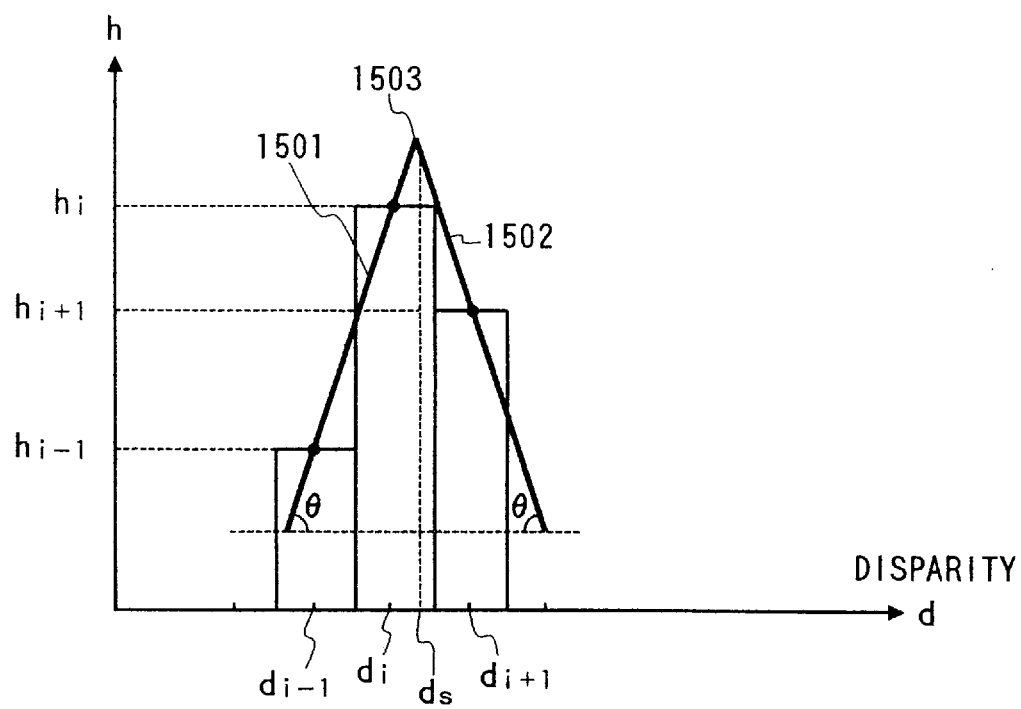
FIG. 21 is a graph showing a method of measuring a disparity at the accuracy of sub-pixel level based on the histogram creased in relation to blocks of the present invention.

The method of sub-pixel level measurement will be explained with reference to FIG. 21. FIG. 21 shows a histogram created in a certain block in accordance with the previously-described method, especially showing the distribution of the number of occurrences in the vicinity of a specific disparity corresponding to a peak position. The sub-pixel level disparity measurement is performed by using the number of occurrences hi, hi−1, hi+1 corresponding to the designated disparities di, di−1, di+1 (in the increment of pixel) existing before and after a peak position ds.

More specifically, a first straight line 1501 is obtained as a line crossing both of two points (di−1, hi−1) and (di, hi). A second straight line 1502 is obtained as a line crossing a point (di+1, hi+1) and having a gradient symmetrical with the line 1501 (i.e. identical in absolute value but opposite in sign). Then, a point 1503 is obtained as an intersecting point of two straight lines 1501 and 1502. A disparity ds, corresponding to thus obtained intersecting point 1503, is finally obtained as a sub-pixel level disparity of the concerned block.

The sub-pixel level disparity measurement, above described, uses a histogram created by the number of occurrences; accordingly, this method is essentially different from the prior art method which basically uses the similarity evaluations C derived from the equation 6.

Second Embodiment

A second embodiment will be explained based on a stereo image measurement using the method of matching stereo images and detecting disparity between the images in accordance with the present invention.

Figure 22:
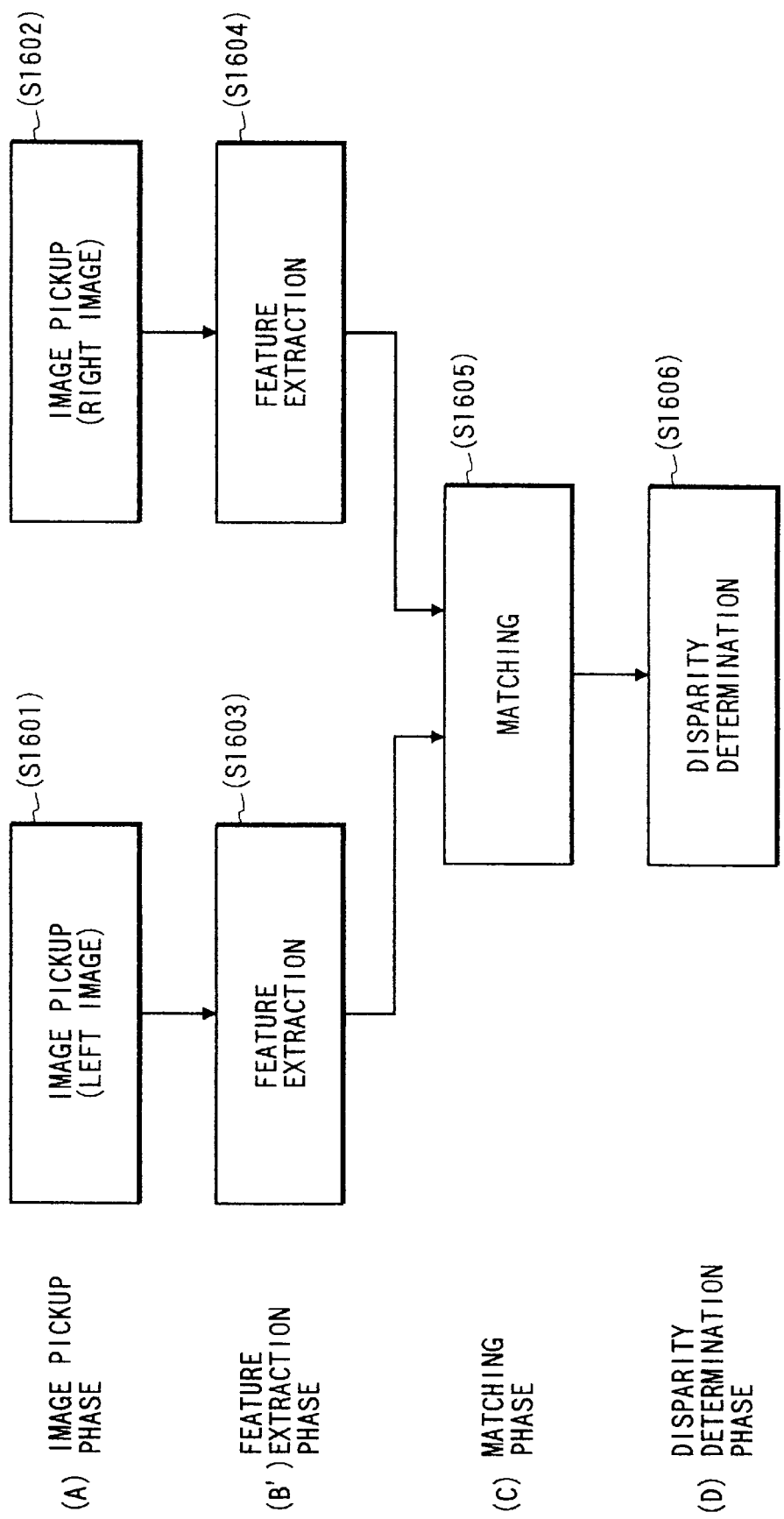
FIG. 22 is a flow diagram showing sequential processes for executing a second embodiment of the present invention, covering the pickup of stereo images through the determination of disparity.

FIG. 22 is a flow diagram showing sequential processes for executing the second embodiment of the present invention, covering the stereo image pickup phase through the disparity determination phase. In the image pickup phase (A), two, right and left, images are taken in through two, right and left, image-pickup devices in steps S1601 and S1602. The processing performed in the image-pickup phase (A) is identical with that of the first embodiment. Then, the right and left images, obtained in the image-pickup phase (A), are respectively subjected to feature extraction in the next feature extraction phase (B') in steps S1603 and S1604. Thereafter, in the succeeding matching phase (C), the extracted features of the right and left images are compared to check how they match with each other in step S1605. Furthermore, in a disparity determination phase (D), a disparity is determined in each block (Step S1606). The processing performed in the matching phase (C) and the disparity determination phase (D) are identical with those of the first embodiment.

Hereinafter, only the portion different from the first embodiment, i.e. the processing of feature extraction phase (B'), will be explained in greater detail.

B' : Feature Extraction Phase

The two images, right image IR and left image IL, obtained in the image pickup phase (A), are developed into a plurality of frequency component images in the feature extraction phase (B').

IL: L1, L2, L3, - - - , Lk, Lk+1, - - - , Ln
IR: R1, R2, R3, - - - . Rk, Rk+1, - - - , Rn

Each frequency-component image is applied the secondary differential processing. Thereafter, each image is converted pixel by pixel into ternary values, thus obtaining the following ternary-valued frequency component images.

TL1, TL2, TL3, - - - , TLk, TLk+1, - - - , TLn
TR1, TR2, TR3, - - - , TRk, TRk+1, - - - , TRn

The flow of processing and its purposes are identical with those of the feature extraction phase (B) of the first embodiment.

Next, the essential portion different from the first embodiment, i.e. a ternary-value processing, will be explained.

Figure 25:
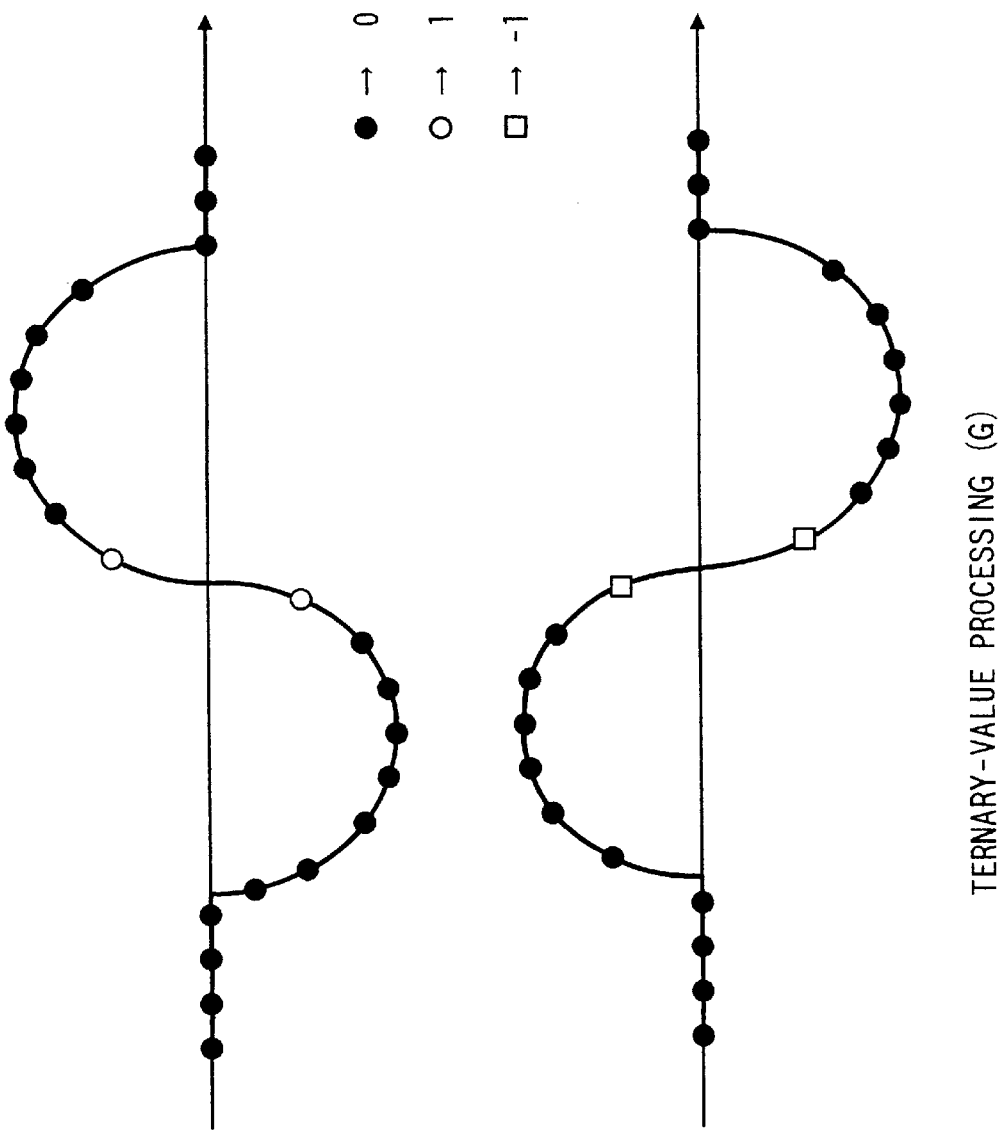
FIG. 25 is a view illustrating a method of transforming or quantizing the frequency component images into ternary values used in the second and third embodiment of the present invention.

FIG. 25 is a view illustrating a method of transforming or quantizing the frequency component images into ternary values used in the second embodiment of the present invention. As shown in FIG. 25, all of frequency component images are classified into three values by judging whether the pixel of a concerned image is related to a zero-crossing point, or whether the sign of its gradient is positive or negative when it corresponds to the zero-crossing point. For example, ternary values are given to respective pixels as follows.

Other than zero-crossing point - - - 0
Zero-crossing point, and Positive gradient - - - 1
Zero-crossing point, and Negative gradient - - - -1

The above-described ternary-value processing makes it possible to quantize the images into 1 or −1 at their edges, especially at the inflection points (=zero-crossing points) otherwise the images are expressed by 0. This ternary-value processing (G) is comparative with or superior to the ternary-value processing (F) of the first embodiment in the accurate detection of edge positions, and also robustness against sensitivity difference between right and left images, although a little bit weak against noises.

Figure 23:
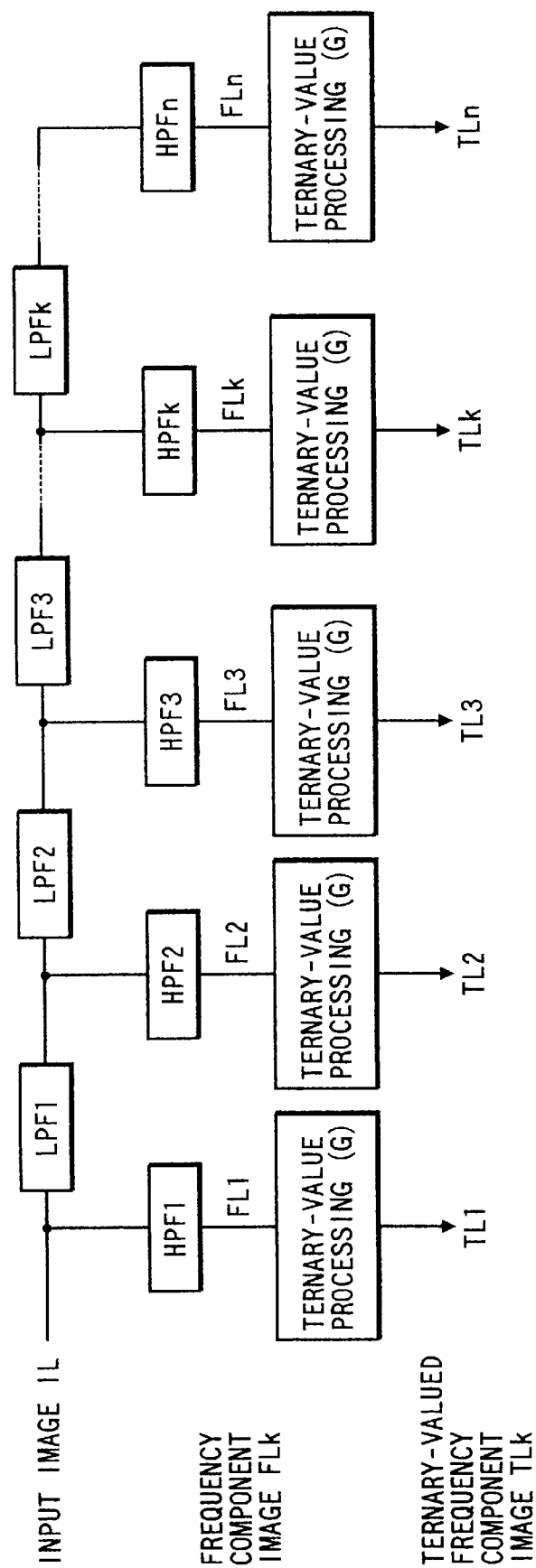
FIG. 23 is a block diagram showing an arrangement of a third apparatus which realizes the processing of feature extraction phase (B') of FIG. 22 in accordance with the second embodiment.

FIG. 23 is a block diagram showing the arrangement of a third apparatus which realizes the processing of feature extraction phase (B') of FIG. 22. Left image IL, received in the feature extraction phase (B'), is the image obtained in the image-pickup phase (A) which is band limited to fc (Hz). The input image IL is developed into a plurality of band signals having different frequency components (i.e. frequency component images FLk, k=1,2,3, - - - ,n) by plural low-pass filters (LPFk, k=1,2,3, - - - ) and high-pass filters (HPFk, k=1,2,3, - - - ,n) combined as shown in the drawing. This processing is identical with that of the first embodiment. The developed frequency component images FLk are converted or quantized into ternary-valued data (i.e. ternary-valued frequency component images TLk, k=1,2,3, - - - ,n) through the above-described ternary-value processing (G).

Each of these plural ternary-valued frequency component image TLk, thus obtained, reveals an edge position involved in each frequency component image. Each edge position is used for the matching of right and left images in the succeeding matching phase (C). Regarding the settings, it is noted that the number of frequency component images FLk or the width of each frequency band should be determined by taking the required performance and the allowable cost range into consideration, in the same manner as in the first embodiment.

Figure 24:
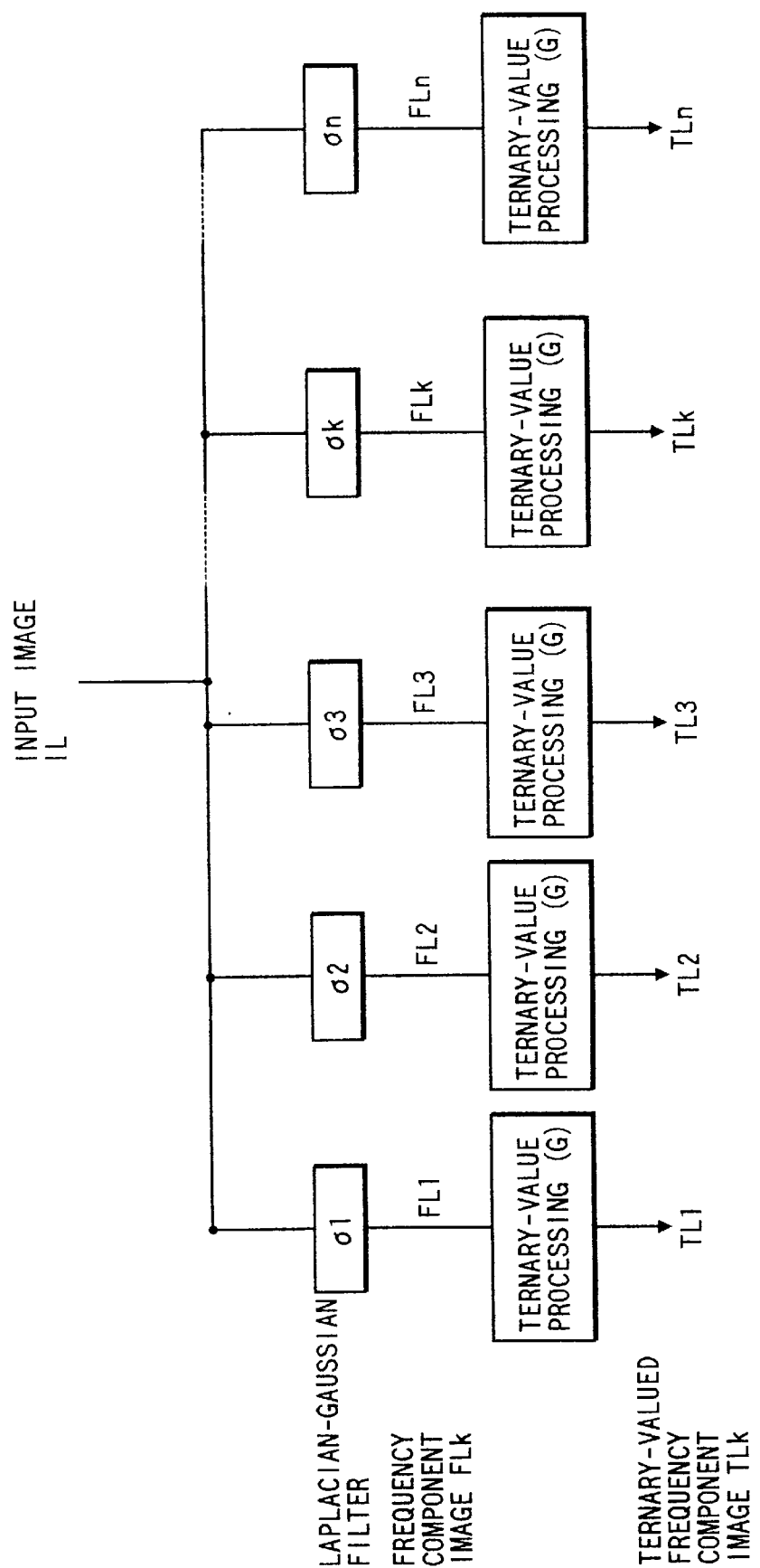
FIG. 24 is a block diagram showing an arrangement of a fourth apparatus which realizes the processing of feature extraction phase (B') of FIG. 22 in accordance with the second embodiment.

FIG. 24 is a block diagram showing the arrangement of a fourth apparatus which realizes the processing of feature extraction phase (B') of FIG. 22. This fourth apparatus is identical with the second apparatus of the first embodiment shown in FIG. 11 except for the ternary-value processing (G).

In this manner, the image is developed into a plurality of frequency component images FLk which are then converted into ternary-valued frequency component images TLk through ternary-value processing. Subsequently, ternary-valued frequency component images TLk are sent to the succeeding matching phase (C) to perform the stereo image matching operation based on one-dimensional windows. And, a disparity of each block is finally determined in the disparity determination phase (D).

Third Embodiment

A third embodiment will be explained based on a stereo image measurement using the method of matching stereo images and detecting disparity between the images in accordance with the present invention.

Figure 26:
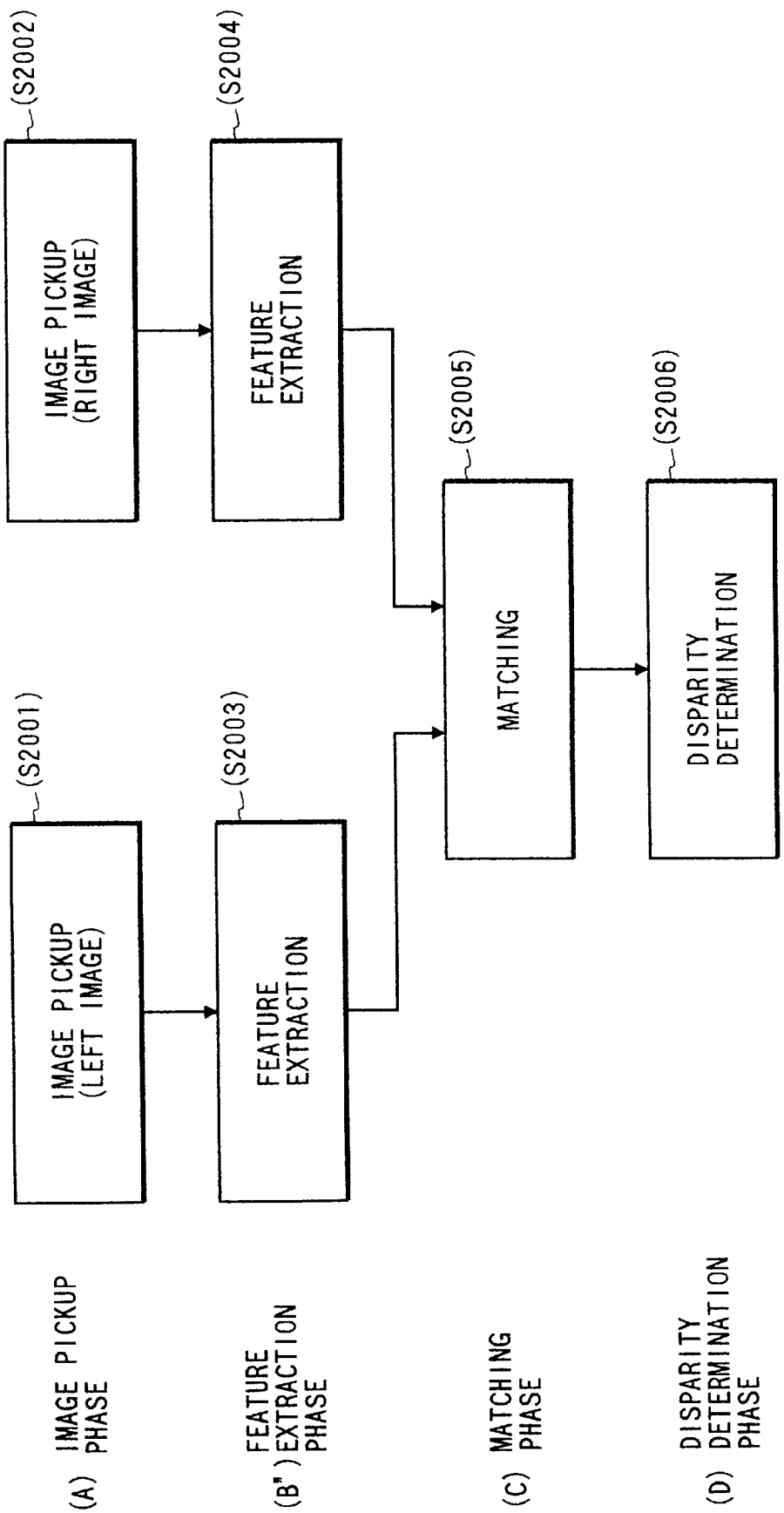
FIG. 26 is a flow diagram showing sequential processes for executing a third embodiment of the present invention, covering the pickup of stereo images through the determination of disparity.

FIG. 26 is a flow diagram showing sequential processes for executing the third embodiment of the present invention, covering the stereo image pickup phase through the disparity determination phase. In the image pickup phase (A), two, right and left, images are taken in through two, right and left, image-pickup devices in steps S2001 and S2002. The processing performed in the image-pickup phase (A) is identical with those of the first and second embodiments. Then, the right and left images, obtained in the image-pickup phase (A), are respectively subjected to feature extraction in the next feature extraction phase (B") in steps S2003 and S2004. Thereafter, in the succeeding matching phase (C), the extracted features of the right and left images are compared to check how they match with each other in step S2005. Furthermore, in a disparity determination phase (D), a disparity is determined in each block (Step S2006). The processing performed in the matching phase (C) and the disparity determination phase (D) are identical with those of the first and second embodiments.

Hereinafter, only the portion different from the first and second embodiments, i.e. the processing of feature extraction phase (B"), will be explained in greater detail.

B": Feature Extraction Phase

The two images, right image IR and left image IL, obtained in the image pickup phase (A), are developed into a plurality of frequency component images in the feature extraction phase (B").

IL: L1, L2, L3, - - - , Lk, Lk+1, - - - , Ln
IR: R1, R2, R3, - - - . Rk, Rk+1, - - - , Rn

Each frequency-component image is applied the secondary differential processing. Thereafter, each image is converted pixel by pixel into ternary values, thus obtaining the following ternary-valued frequency component images.

TL1, TL2, TL3, - - - , TLk, TLk+1, - - - , TLn
TR1, TR2, TR3, - - - , TRk, TRk+1, - - - , TRn

The flow of processing and its purposes are identical with those of the feature extraction phases (B), (B') of the first and second embodiments.

Next, the essential portion different from the first and second embodiments, i.e. a ternary-value processing, will be explained. The ternary-value processing of the third embodiment is characterized in that the low-frequency component images are processed through the previously-described ternary-value processing (F) of the first embodiment while the high-frequency component images are processed through the above-described ternary-value processing (G) of the second embodiment.

The high-frequency component images have accurate information with respect to the edge positions when they are compared with the low-frequency component images. To utilize these accurate information effectively, the zero-crossing point classification is used for converting high-frequency component images into ternary values. However, the edge information, obtained through the ternary-value processing (G), tends to involve erroneous edge information due to noises. To the contrary, the low-frequency component images are converted into ternary values by using the threshold classification since low-frequency component images are not so accurate information for representing the edge positions. The edge information, obtained through the ternary-value processing (F), seldom involves erroneous edge information derived from noises.

Figure 27:
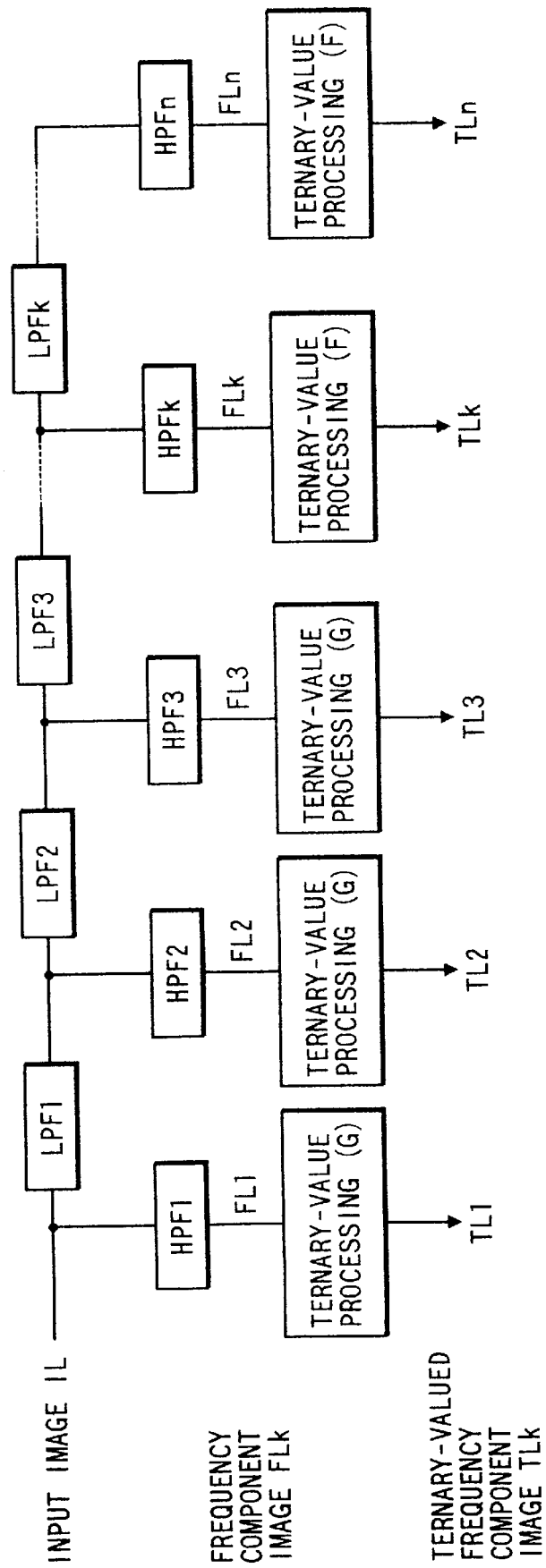
FIG. 27 is a block diagram showing an arrangement of a fifth apparatus which realizes the processing of feature extraction phase (B") of FIG. 26 in accordance with the third embodiment.

FIG. 27 is a block diagram showing the arrangement of a fifth apparatus which realizes the processing of feature extraction phase (B") of FIG. 26. Left image IL, received in the feature extraction phase (B"), is the image obtained in the image-pickup phase (A) which is band limited to fc (Hz). The input image IL is developed into a plurality of band signals having different frequency components (i.e. frequency component images FLk, k=1,2,3, - - - ,n) by plural low-pass filters (LPFk, k=1,2,3, - - - ) and high-pass filters (HPFk, k=1,2,3, - - - ,n) combined as shown in the drawing. This processing is identical with those of the first and second embodiments. The low-frequency component images of the developed frequency component images FLk are converted or quantized into ternary-valued data through the ternary-value processing (F) explained in the first embodiment. On the other hand, the high-frequency component images of the developed frequency component images FLk are converted or quantized into ternary-valued data through the ternary-value processing (G) explained in the second embodiment. Thus, ternary-valued frequency component images TLk (k=1,2,3 - - - ,n) are obtained.

Each of these plural ternary-valued frequency component image TLk, thus obtained, reveals an edge position involved in each frequency component image. Each edge position is used for the matching of right and left images in the succeeding matching phase (C). Regarding the settings, it is noted that the number of frequency component images FLk or the width of each frequency band, as well as selection between the ternary-value processing (F) and the ternary-value processing (G), should be determined by taking the required performance and the allowable cost range into consideration.

Figure 28:
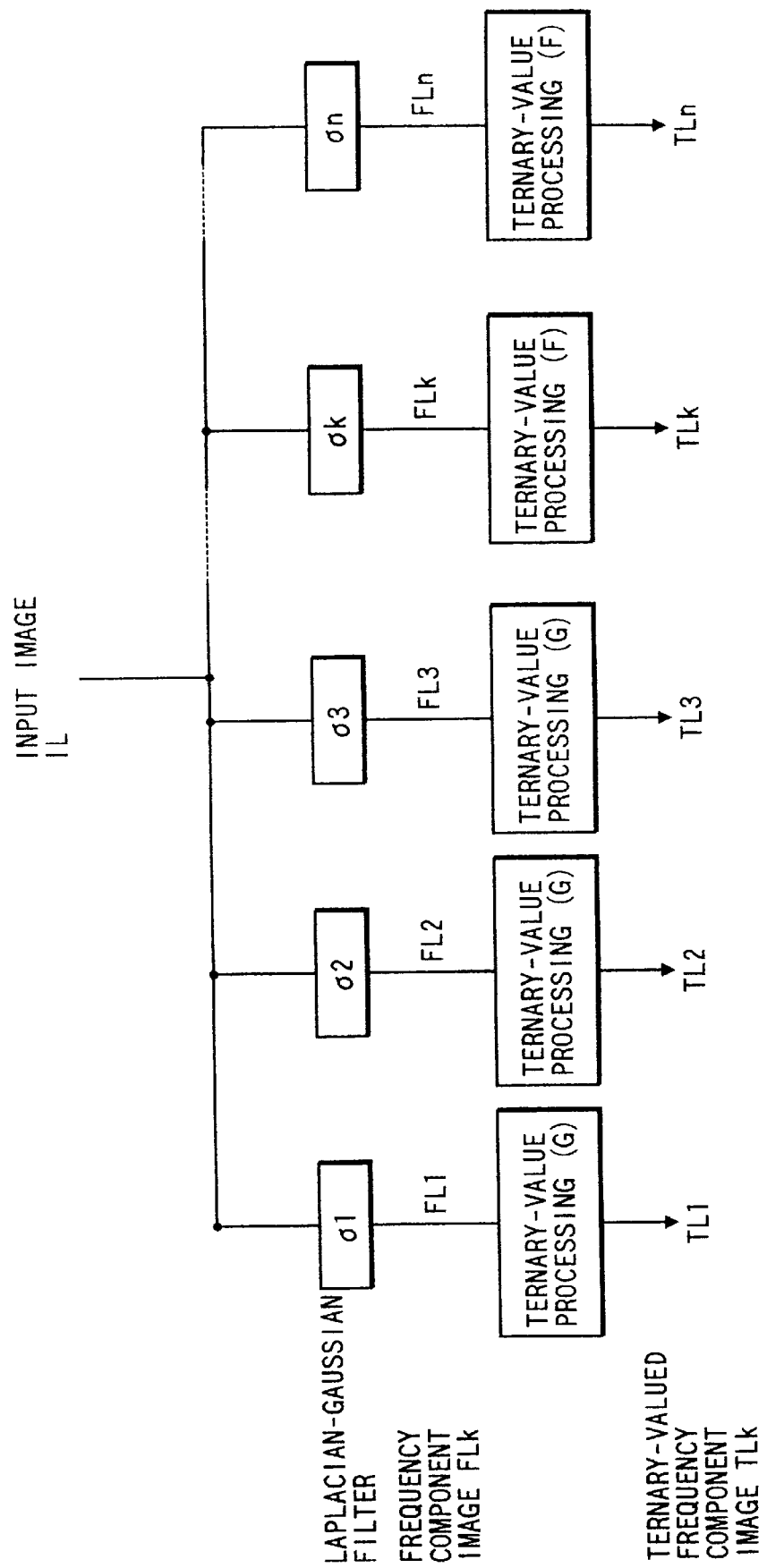
FIG. 28 is a block diagram showing an arrangement of a sixth apparatus which realizes the processing of feature extraction phase (B") of FIG. 26 in accordance with the third embodiment.

FIG. 28 is a block diagram showing the arrangement of a sixth apparatus which realizes the processing of feature extraction phase (B") of FIG. 26. This sixth apparatus is identical with the second and fourth apparatuses of the first and second embodiments shown in FIG. 11 and 24 except for the ternary-value processing portion.

In this manner, the image is developed into a plurality of frequency component images FLk which are then converted into ternary-valued frequency component images TLk through ternary-value processing. Subsequently, ternary-valued frequency component images TLk are sent to the succeeding matching phase (C) to perform the stereo image matching operation based on one-dimensional windows. And, a disparity of each block is finally determined in the disparity determination phase (D).

Miscellaneous

As apparent from the foregoing, the method of the present invention for matching stereo images and detecting a disparity between the images is explained based on the stereo image measurement system embodied into the first, second and third embodiment described above. Although the embodiments of the present invention use the stereo cameras disposed in parallel with each other in the right-and-left direction, it is needless to say that the arrangement of stereo cameras is not limited to the disclosed one.

Furthermore, although the embodiments of the present invention use the odd-number lines only for the scanning operation, the same effect will be obtained by using the objective scanning lines of the even-number lines only. If all the lines are used for the scanning operation, the reliability in the measurement of disparity will be enhanced although the processing volumes is doubled.

Moreover, the embodiments of the present invention adopt a window size of 1×16 (M=16) pixels extending in the horizontal direction and a block size of 16×16 (M=L=16) pixels. Needless to say, practical values for M and L can be varied flexibly.

As explained in the foregoing description, the present invention provides a novel and excellent method of matching stereo images and of detecting a disparity of these images which is small in the computation amount, compact and cheap in the hardware arrangement, speedy in the processing, and reliable and accurate in the performance of the stereo image matching and the disparity detection.

Accordingly, the present invention can be applied, for example, to various industrial monitoring systems, such as an obstacle monitor at a railroad crossing or an invader monitor in a building, by utilizing its capability of always measuring a disparity based on successively sampled stereo images and detecting the change of the disparity.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A method of detecting a disparity between stereo images, comprising the steps of:

dividing each of first and second images IL and IR into a plurality of blocks each having a size of M×L pixels;

matching ternary-valued frequency component images of said images IL and IR;

comparing pixels in a micro region defined by a one-dimensional window set on said first image IL with pixels in a designated micro region on said second image IR;

evaluating a similarity between two micro regions using the following equation:

$$E_{all} = \Sigma \beta k(PN)k + \Sigma \gamma k(ZN)k$$

where PN represents a total number of pixels having an evaluation result "P" while ZN represents a total number of pixels having an evaluation result "Z", and βk and γk represent weighting factors;

searching a first region having a most highest similarity and a second region having a second highest similarity in a concerned block;

specifying a first candidate disparity as a disparity corresponding to said first region, and a second candidate disparity as a disparity corresponding to said second region;

creating a histogram based on said first and second candidate disparities; and determining a valid disparity of said concerned block as a disparity corresponding to a peak position of said histogram.

2. The method defined by claim 1, wherein said first image IL is designated as a reference image, a one-dimensional window capable of encompassing N pixels therein is set on the ternary-valued frequency component image of said first image IL, and a matching region having the same ternary-value pattern as said N pixels in said one-dimensional window is searched from the ternary-valued frequency component image of said second image IR.

3. The method defined by claim 1, wherein one of said first and second images IL and IR is designated as a reference image, a plurality of one-dimensional windows are set on the entire surface of said ternary-valued frequency component image of said reference image through a scanning operation along an epipolar line, so that said one-dimensional windows are successively overlapped at the same intervals of N/2 when each of said one-dimensional windows has a size equivalent to N pixels, and a matching operation is carried out with respect to each of said one-dimensional windows.

4. The method defined by claim 1, wherein said valid disparity is calculated as a sub-pixel level parity corresponding to an intersecting point of a first straight line crossing two points (di−1, hi−1), (di, hi) and a second straight line crossing a point (di+1, hi+1) with a gradient symmetrical with said first straight line, where di−1, di, di+1 represent disparities near the peak position of said histogram and hi−1, hi, hi+represent the number of occurrences of said disparities di−1, di, di+1 respectively.

\* \* \* \* \*

UNITED STATES PATENT AND TRADEMARK OFFICE
CERTIFICATE OF CORRECTION

PATENT NO. : 5,867,591
DATED : February 2, 1999
INVENTOR(S) : Katsumasa Onda

It is certified that error appears in the above-indentified patent and that said Letters Patent is hereby corrected as shown below:

```
On the Title page, item [54] and in Col. 1, line 3, In the Title;
Change "Method of Matching Stereo Images and Method of Measuring
Disparity Between These Image" to --Method Of Matching Stereo
Images and Method Of Measuring Disparity Between These Images--
```

Signed and Sealed this

Twenty-first Day of March, 2000

Attest:

Attesting Officer

Q. TODD DICKINSON

Commissioner of Patents and Trademarks